(12) United States Patent
Okamoto et al.

(10) Patent No.: US 10,371,393 B2
(45) Date of Patent: Aug. 6, 2019

(54) AIR CONDITIONING SYSTEM

(71) Applicant: DAIKIN INDUSTRIES, LTD., Osaka-shi, Osaka (JP)

(72) Inventors: Masakazu Okamoto, Sakai (JP); Michio Moriwaki, Sakai (JP); Hiroshi Yoh, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 1196 days.

(21) Appl. No.: 14/500,993

(22) Filed: Sep. 29, 2014

(65) Prior Publication Data
US 2015/0090803 A1  Apr. 2, 2015

(30) Foreign Application Priority Data

Sep. 30, 2013 (JP) .................................. 2013-205430

(51) Int. Cl.
*F24D 19/10*  (2006.01)
*F24D 5/12*  (2006.01)
*F24D 5/02*  (2006.01)

(52) U.S. Cl.
CPC ........... *F24D 19/1087* (2013.01); *F24D 5/02* (2013.01); *F24D 5/12* (2013.01); *F24D 2200/04* (2013.01); *F24D 2200/123* (2013.01); *Y02B 30/13* (2018.05)

(58) Field of Classification Search
CPC ................................................ F24D 19/1087
USPC ....................................................... 237/2 A
See application file for complete search history.

(56) References Cited

U.S. PATENT DOCUMENTS

| | | | |
|---|---|---|---|
| 7,775,448 B2* | 8/2010 | Votaw | F24F 3/001 236/1 B |
| 2006/0196953 A1* | 9/2006 | Simon | G05D 23/1934 236/46 R |
| 2008/0023564 A1* | 1/2008 | Hall | F24D 12/02 237/12 |
| 2010/0065245 A1* | 3/2010 | Imada | F24F 3/001 165/59 |
| 2010/0070093 A1* | 3/2010 | Harrod | G05B 19/042 700/278 |

(Continued)

FOREIGN PATENT DOCUMENTS

JP  64-54160 A  3/1989
JP  6-82122 A  3/1994

(Continued)

*Primary Examiner* — Steven B McAllister
*Assistant Examiner* — John E Bargero
(74) *Attorney, Agent, or Firm* — Global IP Counselors, LLP

(57) ABSTRACT

An air conditioning system includes a heat pump having a refrigerant radiator, a gas furnace unit having a heating section to heat passing air, a blower generating air flow through the radiator and the heating section, and a controller controlling operation of the heat pump unit, the gas furnace unit, and the blower. The controller has a first operating mode in which the gas furnace unit operates alone as a heat source unit, a second operating mode in which the heat pump unit operates alone as a heat source unit, and a third operating mode in which the gas furnace unit and the heat pump unit operate at the same time as a heat source unit. The controller is configured to select the operating modes based on a parameter relating to outside air temperature that is the temperature of outside air.

14 Claims, 9 Drawing Sheets

(56) References Cited

U.S. PATENT DOCUMENTS

2015/0068226 A1\* 3/2015 Rite ........................ F25B 30/02
                                                                                     62/79

FOREIGN PATENT DOCUMENTS

| JP | 2000-304331 A | 11/2000 |
| --- | --- | --- |
| JP | 2007-285593 A | 11/2007 |
| JP | 2010-236703 A | 10/2010 |
| JP | 2011-58774 A | 3/2011 |

\* cited by examiner

AIR CONDITIONING SYSTEM

TECHNICAL FIELD

The present invention relates to an air conditioning system that is equipped with a gas furnace unit and a heat pump unit.

BACKGROUND ART

Conventionally, there have been air conditioning systems that are equipped with a gas furnace unit and a heat pump unit and realize air conditioning of a target space. For example, JP-A No. S64-54160 discloses an air conditioning system that is equipped with a gas furnace unit and a heat pump unit and which, when it starts operating, selects the gas furnace unit as a heat source unit if the outside air temperature is less than a predetermined temperature and selects the heat pump unit as a heat source unit if the outside air temperature is equal to or greater than the predetermined temperature.

SUMMARY

Technical Problem

However, with the air conditioning system described in JP-A No. S64-54160, depending on the case, it is conceivable that superior energy efficiency is difficult to realize because one of the gas furnace unit and the heat pump unit is operated alone.

Therefore, it is a problem of the present invention to provide an air conditioning system having superior energy efficiency.

Solution to Problem

An air conditioning system according to a first aspect of the invention is equipped with a heat pump unit, a gas furnace unit, a blower, and a controller. The heat pump unit includes a refrigerant radiator. The gas furnace unit includes a heating section. The heating section heats air passing through it. The blower generates an air flow that passes through the radiator and the heating section. The controller controls the operation of the heat pump unit, the gas furnace unit, and the blower. The controller has, as operating modes, a first operating mode, a second operating mode, and a third operating mode. In the first operating mode, the controller causes the gas furnace unit to operate alone as a heat source unit. In the second operating mode, the controller causes the heat pump unit to operate alone as a heat source unit. In the third operating mode, the controller causes the gas furnace unit and the heat pump unit to operate at the same time as a heat source unit. The controller selects the operating modes on the basis of a parameter relating to outside air temperature that is the temperature of outside air.

In the air conditioning system according to the first aspect of the invention, the controller has, as operating modes, the first operating mode in which the controller causes the gas furnace unit to operate alone as a heat source unit, the second operating mode in which the controller causes the heat pump unit to operate alone as a heat source unit, and the third operating mode in which the controller causes the gas furnace unit and the heat pump unit to operate at the same time as a heat source unit, and the controller selects the operating modes on the basis of the parameter relating to the outside air temperature. Because of this, it becomes possible to select the operating mode having superior energy efficiency in accordance with the parameter relating to the outside air temperature, which changes with time. That is, it becomes possible to decide, on the basis of superior or inferior energy efficiency, whether to cause one of the heat pump unit and the gas furnace unit to operate as a heat source unit or cause both to operate as a heat source unit. Thus, the energy efficiency can be kept from dropping. Consequently, air conditioning with superior energy efficiency can be realized.

Here, "energy efficiency" is expressed using the coefficient of performance (COP), for example, as a guide, and specifically is a value obtained by dividing the capacity of a device by consumed energy. The "capacity of a device" is, for example, the heat load processing capacity of the heat pump unit or the gas furnace unit, and is expressed in units such as watt and the like. Also, the "consumed energy" is, for example, the electrical power consumed by the heat pump unit and the quantity of gas consumed by the gas furnace unit, and is expressed in units such as watt and the like.

An air conditioning system according to a second aspect of the invention is the air conditioning system according to the first aspect and is further equipped with a first temperature sensor. The first temperature sensor detects the outside air temperature. The controller selects the first operating mode when the outside air temperature is less than a first standard value. The controller selects the second operating mode when the outside air temperature is equal to or greater than a second standard value. The second standard value is a higher temperature than the first standard value. The controller selects the third operating mode when the outside air temperature is equal to or greater than the first standard value and less than the second standard value.

In the air conditioning system according to the second aspect of the invention, the controller selects the first operating mode when the outside air temperature is less than the first standard value, selects the second operating mode when the outside air temperature is equal to or greater than the second standard value that is a higher temperature than the first standard value, and selects the third operating mode when the outside air temperature is equal to or greater than the first standard value and less than the second standard value. Because of this, it becomes possible to select the operating mode having superior energy efficiency in accordance with the outside air temperature, which changes with time. Thus, the energy efficiency can be precisely kept from dropping.

An air conditioning system according to a third aspect of the invention is the air conditioning system according to the first aspect and is further equipped with a second temperature sensor. The second temperature sensor detects an evaporation temperature of refrigerant in the heat pump unit. The controller selects the first operating mode when the evaporation temperature is less than a third standard value. The controller selects the second operating mode when the evaporation temperature is equal to or greater than a fourth standard value. The fourth standard value is a higher temperature than the third standard value. The controller selects the third operating mode when the evaporation temperature is equal to or greater than the third standard value and less than the fourth standard value.

In the air conditioning system according to the third aspect of the invention, the controller selects the first operating mode when the evaporation temperature is less than the third standard value, selects the second operating mode when the evaporation temperature is equal to or greater than the fourth standard value that is a higher temperature than the third standard value, and selects the third operating mode when the evaporation temperature is equal to or greater than the third standard value and less than the fourth standard value. Because of this, it becomes possible to select the operating mode having superior energy efficiency in accordance with the evaporation temperature, which changes with time in association with the outside air temperature. Thus, the energy efficiency can be precisely kept from dropping.

An air conditioning system according to a fourth aspect of the invention is the air conditioning system according to any of the first aspect to the third aspect and is further equipped with a first temperature sensor and a third temperature sensor. The first temperature sensor detects the outside air temperature. The third temperature sensor is installed in a room and detects an indoor temperature that is the temperature in the room. In the third operating mode, the controller calculates a first load and a second load on the basis of the outside air temperature, the indoor temperature, and a preset temperature. The first load is the heat load processed by the gas furnace unit. The second load is the heat load processed by the heat pump unit. In the third operating mode, the controller adjusts the operating capacities of the gas furnace unit and the heat pump unit on the basis of the first load and the second load.

In the air conditioning system according to the fourth aspect of the invention, in the third operating mode the controller calculates, on the basis of the outside air temperature, the indoor temperature, and the preset temperature, the first load that is the heat load processed by the gas furnace unit and the second load that is the heat load processed by the heat pump unit and adjusts the operating capacities of the gas furnace unit and the heat pump unit on the basis of the first load and the second load. Because of this, in a case where the heat pump unit and the gas furnace unit are being operated at the same time as a heat source unit, it becomes possible to adjust in real time each of the operating capacities of the heat pump unit and the gas furnace unit in accordance with changes in the outside air temperature, the indoor temperature, and the preset temperature. For this reason, the heat pump unit and the gas furnace unit can be operated at operating capacities having superior energy efficiency. Thus, the energy efficiency can be more precisely kept from dropping.

An air conditioning system according to a fifth aspect of the invention is the air conditioning system according to the fourth aspect, wherein the heat pump unit further includes a compressor. The compressor compresses refrigerant. The compressor is variably adjusted its rotating speed by the controller. In the third operating mode, the controller decides the rotating speed of the compressor on the basis of the second load.

In the air conditioning system according to the fifth aspect of the invention, in the third operating mode the controller decides the rotating speed of the compressor on the basis of the second load. Because of this, in a case where the heat pump unit and the gas furnace unit are being operated at the same time as a heat source unit, it becomes possible to precisely adjust in real time the operating capacity of the heat pump unit in accordance with changes in the outside air temperature, the indoor temperature, and the preset temperature. For this reason, the heat pump unit can be operated at an operating capacity having superior energy efficiency. Thus, the energy efficiency can be more precisely kept from dropping.

An air conditioning system according to a sixth aspect of the invention is the air conditioning system according to the fourth aspect or the fifth aspect, wherein the gas furnace unit further includes a combustion unit. Gas combusts in the combustion unit. In the third operating mode, the controller decides the capacity of the combustion unit on the basis of the first load.

In the air conditioning system according to the sixth aspect of the invention, in the third operating mode the controller decides the capacity of the combustion unit on the basis of the first load. Because of this, in a case where the heat pump unit and the gas furnace unit are being operated at the same time as a heat source unit, it becomes possible to precisely adjust the operating capacity of the gas furnace unit in accordance with changes in the outside air temperature, the indoor temperature, and the preset temperature. For this reason, the gas furnace unit can be operated at an operating capacity having superior energy efficiency. For this reason, the energy efficiency can be more precisely kept from dropping.

An air conditioning system according to a seventh aspect of the invention is the air conditioning system according to any of the first aspect to the third aspect and is further equipped with a third temperature sensor. The third temperature sensor is installed in a room and detects an indoor temperature that is the temperature in the room. The gas furnace unit further includes a combustion unit. Gas combusts in the combustion unit. In the third operating mode, the controller causes the combustion unit to operate in a first state when a first difference value is equal to or greater than a first threshold value. The first difference value is a value obtained by subtracting the indoor temperature from a preset temperature. In the third operating mode, when the first difference value is less than the first threshold value, the controller causes the combustion unit to operate in a second state or stops the operation of the combustion unit. The second state is a state in which the capacity is lower than the capacity in the first state.

In the air conditioning system according to the seventh aspect of the invention, in the third operating mode the controller causes the combustion unit to operate in the first state when the first difference value, which is a value obtained by subtracting the indoor temperature from the preset temperature, is equal to or greater than the first threshold value, and causes the combustion unit to operate in the second state in which the capacity is lower than the capacity in the first state or stops the operation of the combustion unit when the first difference value is less than the first threshold value. Because of this, when the indoor temperature has become closer to the preset temperature in a case where the heat pump unit and the gas furnace unit are being operated at the same time as a heat source unit, the gas furnace unit reduces its operating capacity or stops operating. For this reason, the indoor temperature is kept from exceeding the preset temperature. Thus, air conditioning with superior comfort can be realized.

An air conditioning system according to an eighth aspect of the invention is the air conditioning system according to any of the first aspect to the third aspect and is further equipped with a third temperature sensor. The third temperature sensor is installed in a room and detects an indoor temperature that is the temperature in the room. The heat pump unit further includes a compressor. The compressor compresses refrigerant. The compressor is variably adjusted its rotating speed by the controller. In the third operating mode, the controller sets the rotating speed of the compressor to a first speed when a second difference value is less than a second threshold value. The second difference value is a value obtained by subtracting a preset temperature from the indoor temperature. In the third operating mode, when the second difference value is equal to or greater than the second threshold value, the controller sets the rotating speed of the compressor to a second speed or stops the driving of the compressor. The second speed is a lower speed than the first speed.

In the air conditioning system according to the eighth aspect of the invention, in the third operating mode the controller sets the rotating speed of the compressor to the first speed when the second difference value, which is a value obtained by subtracting the preset temperature from the indoor temperature, is less than the second threshold value, and sets the rotating speed of the compressor to the second speed lower than the first speed or stops the driving of the compressor when the second difference value is equal to or greater than the second threshold value. Because of this, when the indoor temperature has exceeded the preset temperature beyond a predetermined value in a case where the heat pump unit and the gas furnace unit are being operated at the same time as a heat source unit, the heat pump unit reduces its operating capacity or stops operating. For this reason, the indoor temperature is easily maintained near the preset temperature. Thus, air conditioning with superior comfort can be realized.

An air conditioning system according to a ninth aspect of the invention is the air conditioning system according to any of the first aspect to the third aspect, wherein in the third operating mode the controller causes either one of the gas furnace unit and the heat pump unit to operate as a main heat source unit and causes the other to operate as an auxiliary heat source unit. In the third operating mode, the controller calculates a first cost and a second cost. The first cost is a cost in the case of causing the gas furnace unit to operate as the main heat source unit. The second cost is a cost in the case of causing the heat pump unit to operate as the main heat source unit. In the third operating mode, the controller causes the gas furnace unit to operate as the main heat source unit and causes the heat pump unit to operate as the auxiliary heat source unit when the first cost is lower than the second cost. In the third operating mode, the controller causes the heat pump unit to operate as the main heat source unit and causes the gas furnace unit to operate as the auxiliary heat source unit when the first cost is higher than the second cost. In the third operating mode, the controller calculates a third load. The third load is the heat load processed by the auxiliary heat source unit. In the third operating mode, the controller adjusts the operating capacity of the auxiliary heat source unit on the basis of the third load.

In the air conditioning system according to the ninth aspect of the invention, in the third operating mode the controller causes whichever of the gas furnace unit and the heat pump unit has the lower cost to operate as a main heat source unit, causes whichever of the gas furnace unit and the heat pump unit has the higher cost to operate as an auxiliary heat source unit, calculates the third load processed by the auxiliary heat source unit, and adjusts the operating capacity of the auxiliary heat source unit. Because of this, in the case of operating the heat pump unit and the gas furnace unit at the same time, it becomes possible to set high the operating capacity of whichever of the gas furnace unit and the heat pump unit has the lower cost and set low the operating capacity of whichever of the gas furnace unit and the heat pump unit has the higher cost. For this reason, costs can be kept from rising. Thus, air conditioning with superior economic efficiency can be realized.

Advantageous Effects of Invention

In the air conditioning system according to the first aspect of the invention, the energy efficiency can be kept from dropping. Consequently, air conditioning with superior energy efficiency can be realized.

In the air conditioning system according to the second aspect and the third aspect of the invention, the energy efficiency can be precisely kept from dropping.

In the air conditioning system according to the fourth aspect to the sixth aspect of the invention, the energy efficiency can be more precisely kept from dropping.

In the air conditioning system according to the seventh aspect and the eighth aspect of the invention, air conditioning with superior comfort can be realized.

In the air conditioning system according to the ninth aspect of the invention, air conditioning with superior economic efficiency can be realized.

DETAILED DESCRIPTION OF EMBODIMENT(S)

A heating system 10 according to an embodiment of the present invention will be described below with reference to the drawings. The embodiment below is a specific example of the present invention, is not intended to limit the technical scope of the present invention, and can be appropriately changed without departing from the spirit of the invention.

(1) Heating System 10

Figure 1:
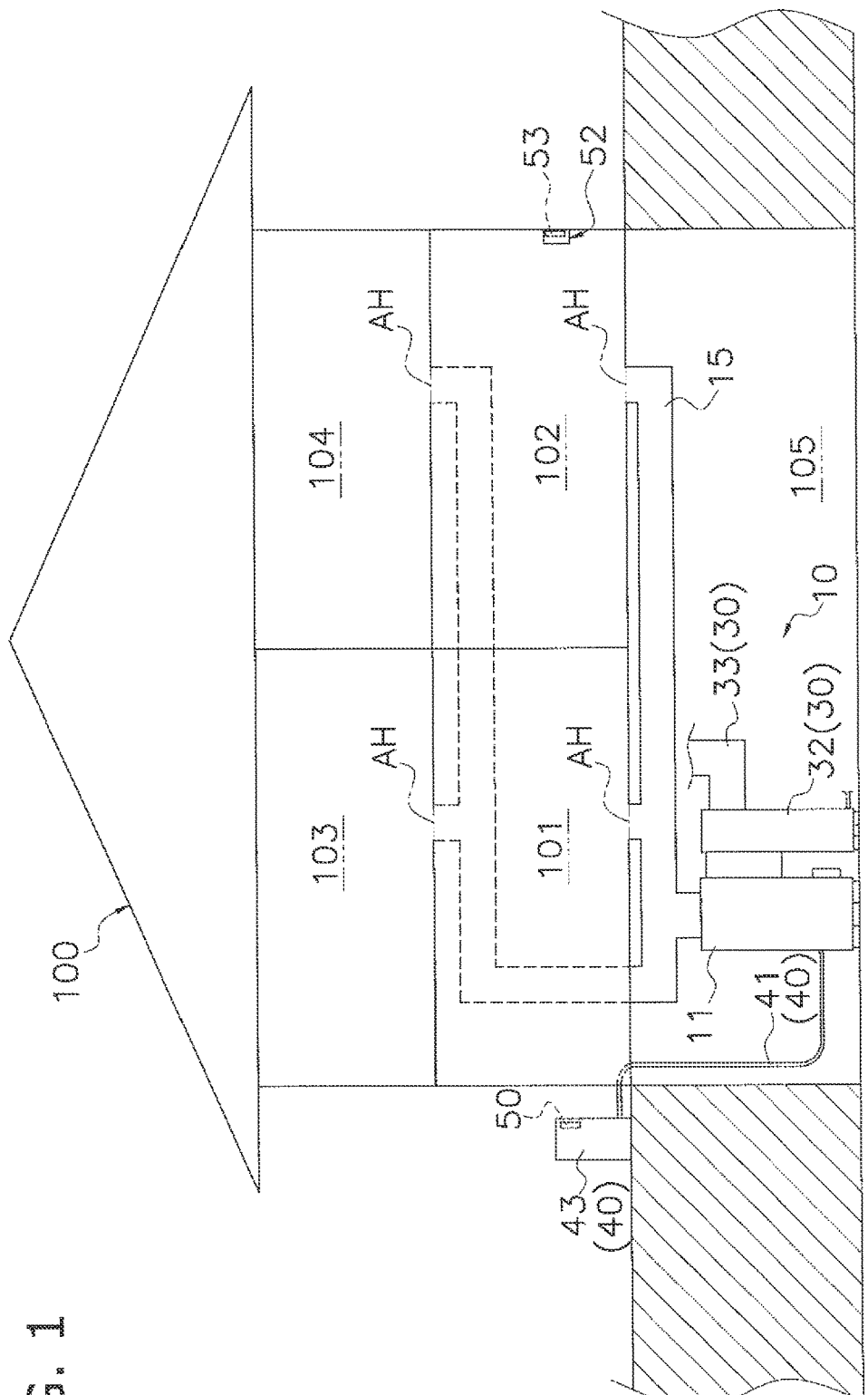
FIG. 1 is a schematic diagram showing the arrangement of a heating system according to an embodiment of the present invention.

FIG. 1 is a schematic diagram showing the arrangement of the heating system 10 according to the embodiment of the present invention. The heating system 10 can be applied, for example, to a one-story residential structure, such as a house, or a low-rise building. In the present embodiment, the heating system 10 is installed in a two-story house 100. Rooms 101 and 102 are disposed on the first floor of the house 100, and rooms 103 and 104 are disposed on the second floor of the house 100. Air vents AH are formed in each of the rooms 101, 102, 103, and 104. Furthermore, a basement 105 is disposed in the house 100.

The heating system 10 is a so-called ducted air conditioning system, and is mainly equipped with a main body casing 11, a duct 15, a fan unit 20, a gas furnace unit (hereinafter abbreviated as GF unit) 30, a heat pump unit (hereinafter abbreviated as HP unit) 40, and an electrical component unit 52. The heating system 10 causes one or both of the GF unit 30 and the HP unit 40 to operate as a heat source unit in accordance with a predetermined condition to thereby realize air conditioning of the rooms 101 to 104. Each unit will be described below.

(2) Details of Each Unit

(2-1) Main Body Casing 11

Figure 2:
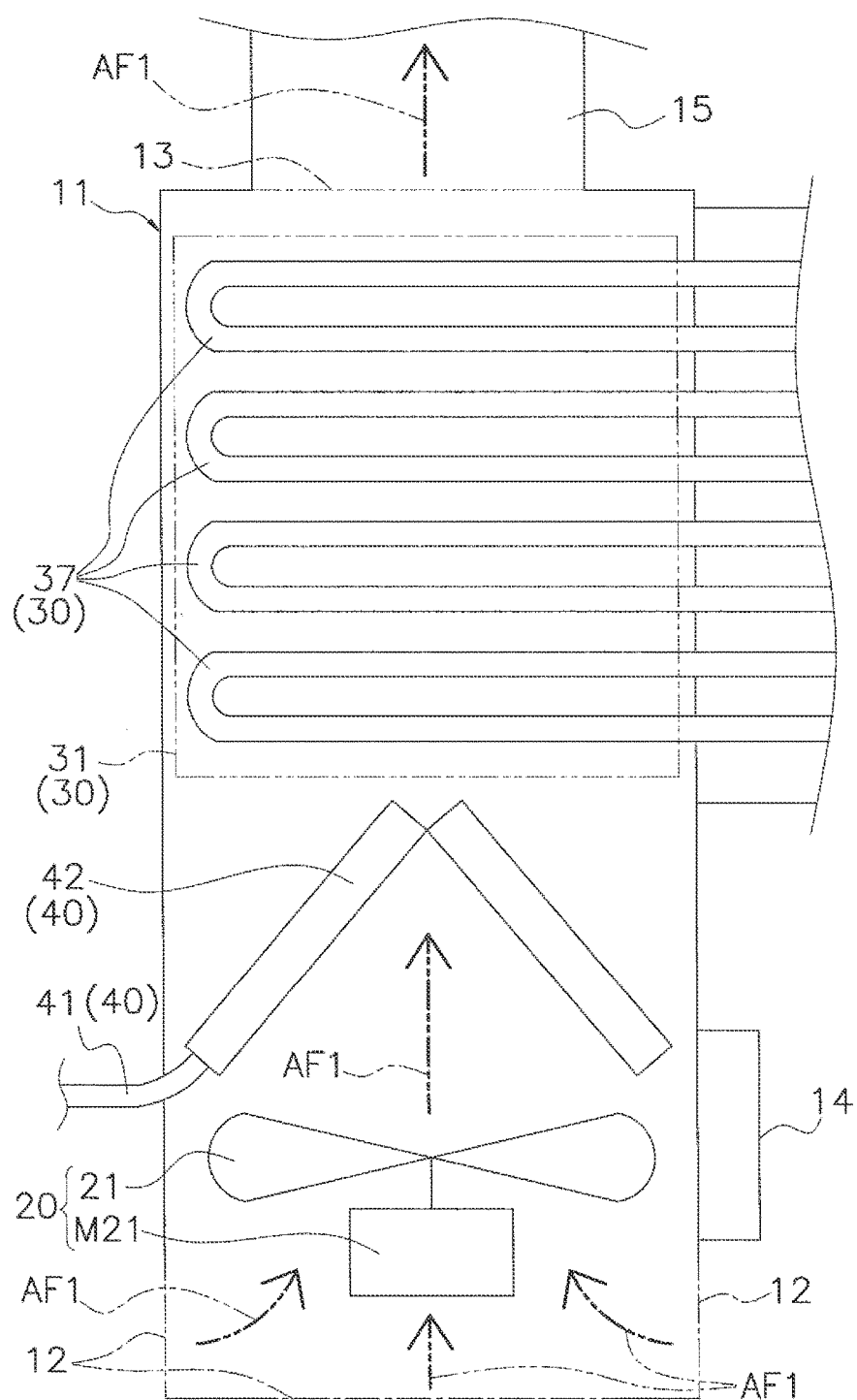
FIG. 2 is a schematic configuration diagram of the inside of a main body casing.

FIG. 2 is a schematic configuration diagram of the inside of the main body casing 11. The main body casing 11 is a casing made of metal, for example. The fan unit 20, a heat exchange section 31 (described later) of the GF unit 30, and an indoor heat exchanger 42 (described later) of the HP unit 40 are disposed inside the main body casing 11. Air inlets 12 for taking in air are formed in the bottom portion of the main body casing 11 and in the side portions in the neighborhood of the bottom portion of the main body casing 11. An air outlet 13 for discharging the air that has been taken in is formed in the upper portion of the main body casing 11. An electrical component box 14 for housing various electrical components is disposed on the side portion of the main body casing 11. An air vent (not shown in the drawings) for taking in air for cooling the electrical components installed inside the electrical component box 14 is formed in the electrical component box 14.

(2-2) Duct 15

The duct 15 is a pipe made of metal for delivering air. The duct 15 is connected via the air outlet 13 to the main body casing 11, and is communicated with the inside of the main body casing 11. The duct 15 extends upward from the section where it is connected to the main body casing 11, and then branches into two. One of the two branches of the duct 15 extends along the ceiling of the basement 105, branches again, and is connected to the air vent AH of the room 101 and the air vent AH of the room 102, whereby the duct 15 is communicated with the rooms 101 and 102. The other of the two branches of the duct 15 extends upward, then extends along the ceiling of the first floor, branches again, and is connected to the air vent AH of the room 103 and the air vent AH of the room 104, whereby the duct 15 is communicated with the rooms 103 and 104. The inside of the main body casing 11 is communicated with the rooms 101 to 104 via the duct 15 disposed in this way.

(2-3) Fan Unit 20

The fan unit 20 (which corresponds to a "blower" in the claims) is a unit for generating an air flow AF1. The fan unit 20 is disposed in the neighborhood of the bottom portion in the main body casing 11. The fan unit 20 has a fan 21 and a first fan motor M21.

The fan 21 is a blower such as a propeller fan or a multi-blade fan, for example. The fan 21 is connected to a rotating shaft of the first fan motor M21. The first fan motor M21 is connected via a cable (not shown in the drawings) to a first power supply unit 211 housed in the electrical component box 14, and is supplied with power from the first power supply unit 211. When the first fan motor M21 is supplied with power and driven, the fan 21 rotates. When the fan 21 rotates, the air flow AF1 is generated.

The air flow AF1 is a flow of air that flows into the main body casing 11 from the air inlets 12, sequentially passes through the indoor heat exchanger 42 (described later) of the HP unit 40 and the heat exchange section 31 (described later) of the GF unit 30, thereafter flows out via the air outlet 13 to the outside of the main body casing 11, and flows via the duct 15 and the air vents AH into the rooms 101 to 104.

(2-4) GF Unit (Gas Furnace Unit) 30

The GF unit 30 is mainly configured from the heat exchange section 31, a gas furnace main body unit (hereinafter abbreviated as GF main body unit) 32, and an exhaust duct 33.

(2-4-1) Heat Exchange Section 31

The heat exchange section 31 is disposed in the main body casing 11. Specifically, the heat exchange section 31 refers to combustion gas pipes 37 (described later) that are disposed in the main body casing 11. When the air flow AF1 is generated in a case where a combustion gas (described later) is present in the heat exchange section 31, heat exchange takes place between the air flow AF1 and the heat exchange section 31. That is, when the GF unit 30 operates as a heat source unit, the heat exchange section 31 functions as a "heating section" that heats the air flow AF1 passing through it.

(2-4-2) GF Main Body Unit (Gas Furnace Main Body Unit) 32

Figure 3:
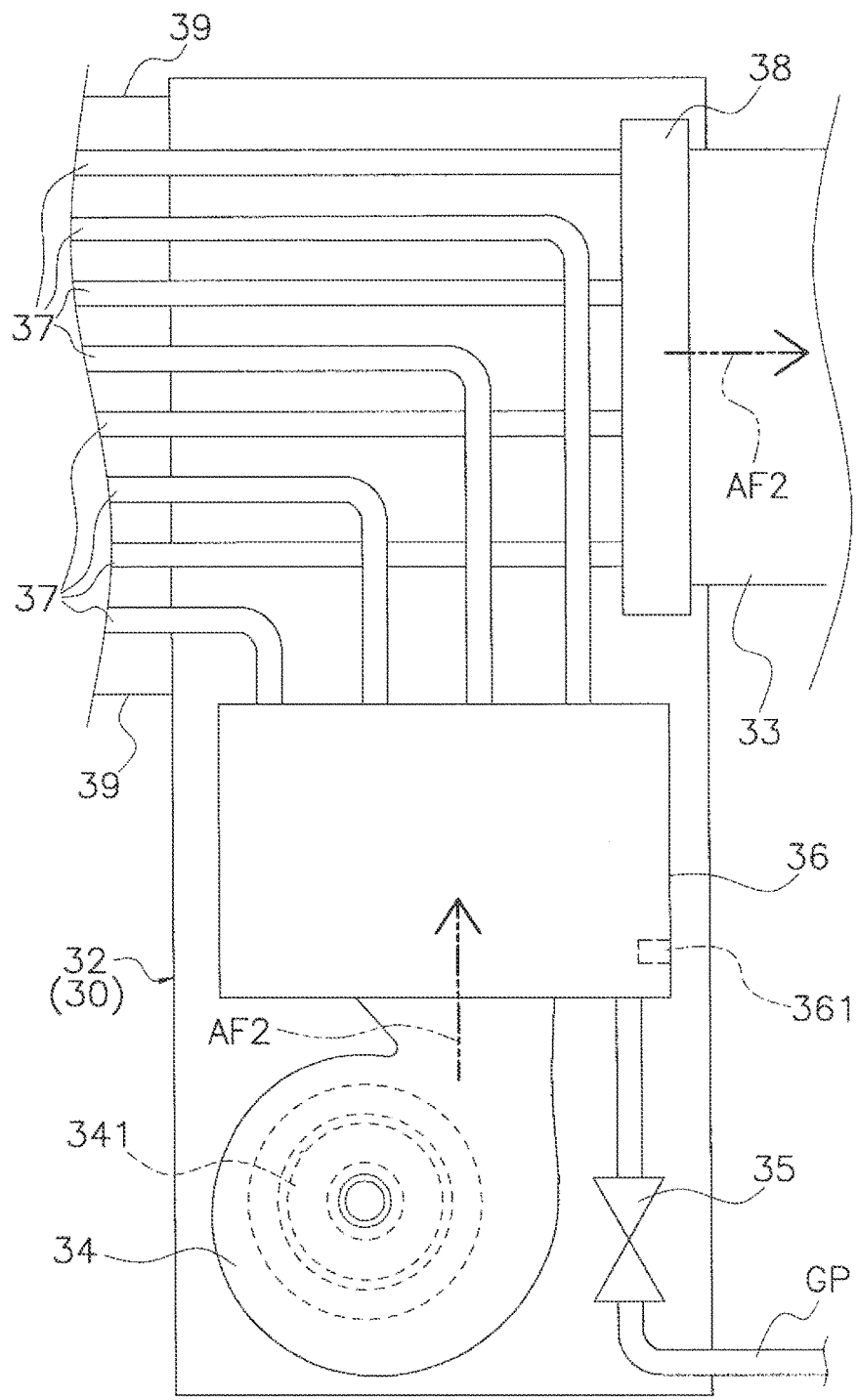
FIG. 3 is a schematic configuration diagram of the inside of a gas furnace main body unit.

FIG. 3 is a schematic configuration diagram of the inside of the GF main body unit 32. The GF main body unit 32 is disposed adjacent to the main body casing 11. A gas pipe GP that supplies fuel gas such as vaporized liquefied natural gas or liquefied petroleum gas, for example, is connected to the GF main body unit 32. Mainly a fan 34, a gas valve 35, a combustion unit 36, the combustion gas pipes 37, and an exhaust header 38 are housed in the GF main body unit 32.

The fan 34 is a blower such as a propeller fan or a multi-blade fan, for example, and is a sirocco fan in the present embodiment. The fan 34 includes a fan rotor 341. The fan rotor 341 is connected to a rotating shaft of a second fan motor (not shown in the drawings). The second fan motor is connected via a cable (not shown in the drawings) to a second power supply unit 342 disposed in the electrical component box 14, and is supplied with power from the second power supply unit 342. When the second fan motor is supplied with power and driven, the fan rotor 341 rotates and an air flow AF2 is generated. The air flow AF2 is a flow of air that flows into the GF main body unit 32 from an air inlet (not shown in the drawings) formed in the GF main body unit 32, passes through the combustion unit 36, the combustion gas pipes 37, and the exhaust header 38, and flows out via the exhaust duct 33 to the outside of the GF main body unit 32. The fan 34 is communicated with the combustion unit 36, and the air flow AF2 generated by the fan 34 flows into the combustion unit 36.

The gas valve 35 is a valve such as an electrically powered valve, for example, and is an electromagnetic valve in the present embodiment. The gas valve 35 is disposed on the gas pipe GP that extends from outside the GF main body unit 32 to the combustion unit 36. The gas valve 35 is connected via a cable (not shown in the drawings) to a gas valve opening and closing unit 351 disposed in the electrical component box 14, and the opening and closing of the gas valve 35 is controlled by the gas valve opening and closing unit 351. When the gas valve 35 is opened, the fuel gas flowing through the gas pipe GP flows into the combustion unit 36 and mixes with the air included in the air flow AF2. When the gas valve 35 is closed, the supply of the fuel gas to the combustion unit 36 is stopped.

A plug 361 is disposed in the combustion unit 36. The plug 361 is connected via a cable (not shown in the drawings) to a plug power supply unit 362 disposed in the electrical component box 14, and is supplied with power. When the gas valve 35 is opened in a state in which the fan 34 is driven, the air flow AF2 and the fuel gas become mixed in the combustion unit 36. In this state, when power is supplied from the plug power supply unit 362 to the plug 361, an electrical discharge is produced and ignition occurs. Because of this, the gas mixture combusts and becomes combustion gas. The combustion gas pipes 37 are connected to the combustion unit 36, and the combustion gas flows into the combustion gas pipes 37 as the air flow AF2.

Each of the combustion gas pipes 37 has one end connected to the combustion unit 36 and the other end connected to the exhaust header 38. More specifically, each of the combustion gas pipes 37 extends in the vertical direction from the combustion unit 36, curves, and extends horizontally to the main body casing 11. Then, the combustion gas pipes 37 extend horizontally inside the main body casing 11 as the heat exchange section 31. Thereafter, the combustion gas pipes 37 double back and extend to the exhaust header 38 in the GF main body unit 32. The combustion gas flowing into the combustion gas pipes 37 exchanges heat with the air flow AF1 when the combustion gas passes through the heat exchange section 31 inside the main body casing 11, and thereafter the combustion gas flows into the exhaust header 38. The sections of the combustion gas pipes 37 extending between the GF main body unit 32 and the main body casing 11 are surrounded and protected by metal panels 39.

In the exhaust header 38, the combustion gas flowing out from the combustion gas pipes 37 is collected as exhaust gas. The exhaust header 38 is connected to the exhaust duct 33. The exhaust gas collected in the exhaust header 38 flows into the exhaust duct 33.

(2-4-3) Exhaust Duct 33

The exhaust duct 33 is a duct made of metal, for example. The exhaust duct 33 has one end connected to the exhaust header 38. The exhaust duct 33 extends along the ceiling of the basement 105, and has another end fixed to an outer wall of the house 100 (not shown in the drawings). The exhaust gas flowing into the exhaust duct 33 passes through the exhaust duct 33, and is expelled to the outside of the house 100.

(2-5) HP Unit (Heat Pump Unit) 40

Figure 4:
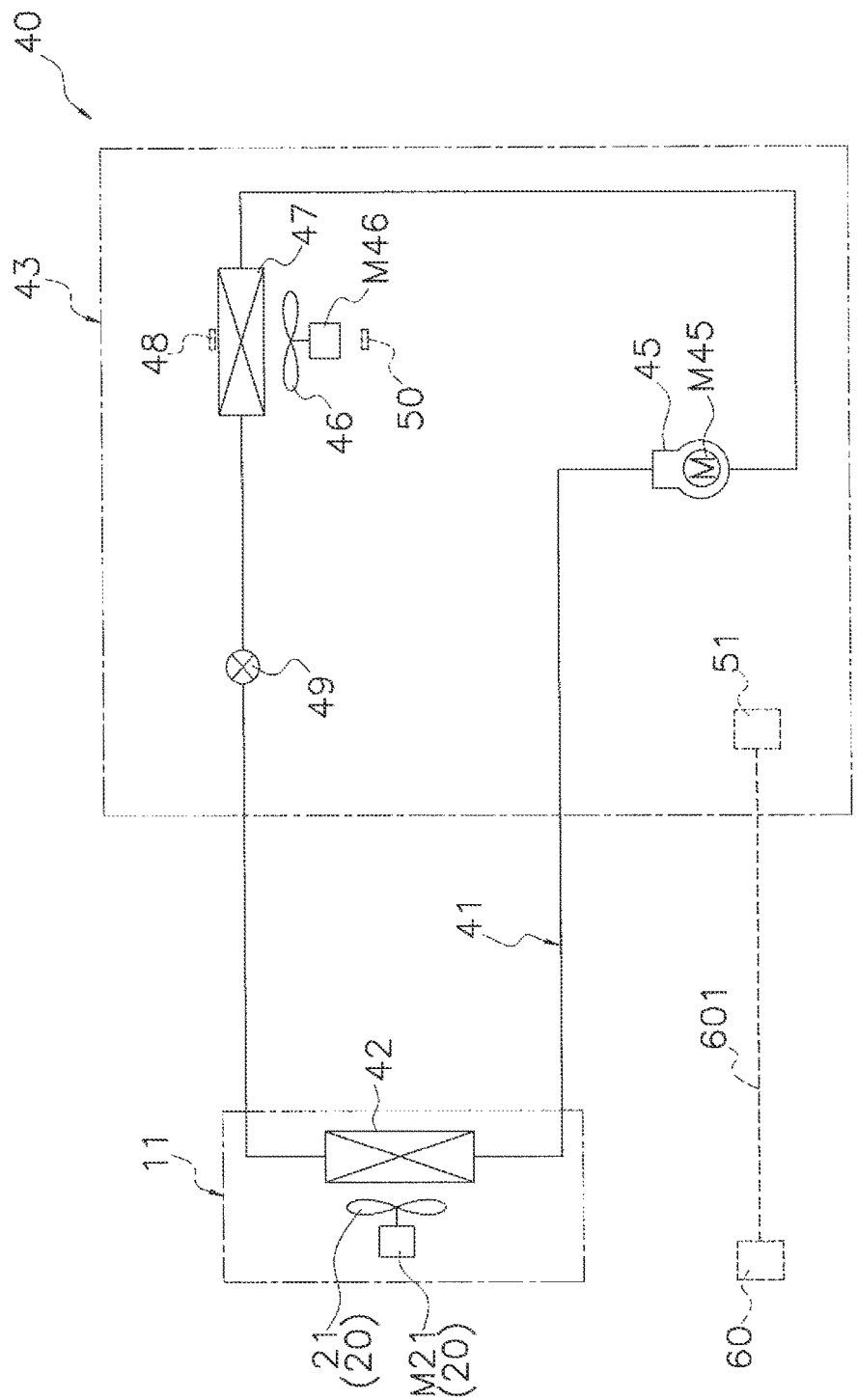
FIG. 4 is a refrigerant circuit diagram of a heat pump unit.

FIG. 4 is a refrigerant circuit diagram of the HP unit 40. The HP unit 40 mainly has a refrigerant pipe 41, the indoor heat exchanger 42, and an outdoor unit 43, and a refrigerant circuit is configured in the HP unit 40 as a result of these being connected.

(2-5-1) Refrigerant Pipe 41

The refrigerant pipe 41 is a pipe made of copper, for example, and refrigerant flows inside. The refrigerant pipe 41 interconnects the indoor heat exchanger 42 and the outdoor unit 43.

(2-5-2) Indoor Heat Exchanger 42

The indoor heat exchanger 42 is a cross fin heat exchanger or a microchannel heat exchanger, for example. The indoor heat exchanger 42 includes heat transfer tubes (not shown in the drawings) inside of which refrigerant flows. The refrigerant pipe 41 is connected to inflow ports and outflow ports of the heat transfer tubes. The indoor heat exchanger 42 is disposed in such a way as to be positioned above the fan unit 20 and below the heat exchange section 31 of the GF unit 30 inside the main body casing 11. In other words, the indoor heat exchanger 42 is positioned on the air flow AF1 downstream side of the fan unit 20 and on the air flow AF1 upstream side of the heat exchange section 31 of the GF unit 30. The indoor heat exchanger 42 disposed in this way is configured in such a way that in a state in which the HP unit 40 is operating as a heat source unit, the air flow AF1 and the refrigerant flowing through the heat transfer tubes exchange heat when the air flow AF1 passes through the indoor heat exchanger 42. When the HP unit 40 operates as a heat source unit, the indoor heat exchanger 42 functions as a refrigerant condenser or radiator.

(2-5-3) Outdoor Unit 43

The outdoor unit 43 is disposed outdoors. The outdoor unit 43 mainly has inside of it a compressor 45, an outdoor fan 46, an outdoor heat exchanger 47, a refrigerant temperature sensor 48, an expansion valve 49, an outside air temperature sensor 50, and an outdoor unit control unit 51.

The compressor 45 is a mechanism that sucks in low-pressure gas refrigerant, compresses the low-pressure gas refrigerant into high-pressure gas refrigerant, and discharges the high-pressure gas refrigerant. The compressor 45 is a rotary or scroll positive-displacement compressor, for example. Furthermore, the compressor 45 is, for example, a closed compressor having a casing (not shown in the drawings) inside of which is housed a compressor motor M45 that is a drive source. The compressor motor M45 is, for example, a 3-phase brushless DC motor. The compressor motor M45 has its rotating speed appropriately adjusted by the outdoor unit control unit 51. Because of this, the HP unit 40 has its operating capacity variably controlled.

The outdoor fan 46 is a blower such as a propeller fan, for example. The outdoor fan 46 is connected to a rotating shaft of an outdoor fan motor M46. The outdoor fan motor M46 is connected via a cable (not shown in the drawings) to an outdoor fan power supply unit (not shown in the drawings) included in the later-described outdoor unit control unit 51, and is supplied with power. When the outdoor fan motor M46 is supplied with power and driven, the outdoor fan 46 rotates, and an air flow that flows from the outside to the inside of the outdoor unit 43 and passes through the outdoor heat exchanger 47 is generated.

The outdoor heat exchanger 47 is a cross fin heat exchanger or a microchannel heat exchanger, for example. The outdoor heat exchanger 47 includes heat transfer tubes (not shown in the drawings) inside of which refrigerant flows. The refrigerant pipe 41 is connected to inflow ports and outflow ports of the heat transfer tubes. The outdoor heat exchanger 47 is configured in such a way that when the air flow generated by the outdoor fan 46 passes through it, the air flow and the refrigerant flowing through the heat transfer tubes exchange heat. When the HP unit 40 operates as a heat source unit, the outdoor heat exchanger 47 functions as a refrigerant evaporator.

The refrigerant temperature sensor 48 (which corresponds to a "second temperature sensor" in the claims) is a sensor such as a thermocouple or a thermistor, for example. The refrigerant temperature sensor 48 detects the temperature of the refrigerant flowing in the outdoor heat exchanger 47. The refrigerant temperature sensor 48 is connected via a cable (not shown in the drawings) to the outdoor unit control unit 51, and outputs an analog signal as to its detection value.

The expansion valve 49 is configured by an electrically powered valve, for example. The expansion valve 49 is positioned between the indoor heat exchanger 42 and the outdoor heat exchanger 47. The expansion valve 49 reduces the pressure of the high-pressure liquid refrigerant condensed in the indoor heat exchanger 42. The expansion valve 49 is connected via a cable (not shown in the drawings) to the outdoor unit control unit 51 and has its opening degree appropriately adjusted by the outdoor unit control unit 51.

The outside air temperature sensor 50 (which corresponds to a "first temperature sensor" in the claims) is a sensor such as a thermocouple or a thermistor, for example. In the present embodiment, the outside air temperature sensor 50 is installed in the outdoor unit 43. The outside air temperature sensor 50 detects the temperature of outside air as an outside air temperature To. The outside air temperature sensor 50 is connected via a cable (not shown in the drawings) to the outdoor unit control unit 51, and outputs an analog signal as to its detection value. The outside air temperature sensor 50 does not invariably have to be installed in the outdoor unit 43, and may also be installed on an outside wall of the house 100, for example.

The outdoor unit control unit 51 is a microcomputer configured from a CPU, a memory and the like. The outdoor unit control unit 51 includes an inverter (not shown in the drawings) for adjusting the rotating speed of the compressor motor M45. Furthermore, the outdoor unit control unit 51 includes the outdoor fan power supply unit for supplying power to the outdoor fan motor M46. The outdoor unit control unit 51 is connected via a cable 601 to a controller 60 (described later) and sends signals to and receives signals from the controller 60. Specifically, the outdoor unit control unit 51 receives instructions from the controller 60 to cause the inverter and the outdoor fan power supply unit to function. Because of this, the compressor motor M45 is driven at the designated rotating speed, and the outdoor fan motor M46 is also driven. Furthermore, the outdoor unit control unit 51 receives the analog signal that is output from the refrigerant temperature sensor 48, and performs analog-to-digital conversion to generate refrigerant temperature information. Furthermore, the outdoor unit control unit 51 receives the analog signal that is output from the outside air temperature sensor 50, and performs analog-to-digital conversion to generate outside air temperature information. The outdoor unit control unit 51 appropriately sends the generated refrigerant temperature information and outside air temperature information to the controller 60.

(2-6) Electrical Component Unit 52

The electrical component unit 52 is a unit that includes various electrical components. The electrical component unit 52 is installed on a side wall in the room 102. The electrical component unit 52 mainly includes an indoor temperature sensor 53, an input unit 54, a display unit 55, and the controller 60.

(2-6-1) Indoor Temperature Sensor 53

The indoor temperature sensor 53 (which corresponds to a "third temperature sensor" in the claims) includes a sensor such as a thermocouple or a thermistor, for example. The indoor temperature sensor 53 detects the temperature in the room 102. That is, the indoor temperature sensor 53 detects an indoor temperature Ti (described later). Furthermore, the indoor temperature sensor 53 includes an interface (not shown in the drawings) having a communication function and an analog-to-digital conversion function. The indoor temperature sensor 53 is connected via a cable 601 (see FIG. 5) to the controller 60. The indoor temperature sensor 53 sends to the controller 60 a digital signal obtained by performing analog-to-digital conversion on its detection value. In the present embodiment, the indoor temperature sensor 53 is disposed in the room 102, but the indoor temperature sensor 53 does not invariably have to be disposed in the room 102 and may also be installed in a room other than the room 102 in the house 100.

(2-6-2) Input Unit 54

The input unit 54 is configured by input keys and a touch panel, for example (not shown in the drawings). The input unit 54 is input instructions by a user. For example, the user inputs instructions to start operating, stop operating, select a preset temperature and the like via the input unit 54. The input unit 54 is connected via a cable 601 (see FIG. 5) to the controller 60. The input unit 54 sends instruction signals corresponding to the input instructions to the controller 60.

(2-6-3) Display Unit 55

The display unit 55 is configured by an LED lamp, a liquid crystal panel or the like, for example (not shown in the drawings). The display unit 55 is connected via a cable 601 (see FIG. 5) to the controller 60, and receives display data signals from the controller 60. The display unit 55 displays the operating status of the heating system 10 (e.g., whether or not the heating system 10 is in operation, the preset temperature, etc.), the status of the indoor temperature and the like on the basis of the received display data signals.

(2-6-4) Controller 60

The controller 60 is a microcomputer that includes a RAM, a ROM, a CPU and the like. The controller 60 sends signals to and receives signals from, and controls the operation of, each unit connected to it via the cables 601. The controller 60 has plural operating modes including a first operating mode, a second operating mode, and a third operating mode. The controller 60 executes control according to the operating modes. The first operating mode is a control mode in which the controller 60 causes the GF unit 30 to operate alone as a heat source unit. The second operating mode is a control mode in which the controller 60 causes the HP unit 40 to operate alone as a heat source unit. The third operating mode is a control mode in which the controller 60 causes the GF unit 30 and the HP unit 40 to operate at the same time as a heat source unit. The controller 60 switches between the operating modes in accordance with a predetermined condition, and controls the operation of devices such as the fan unit 20, the GF unit 30, and the HP unit 40. The details of the controller 60 will be described under the heading "(3) Details of Controller 60" below.

(3) Details of Controller 60

Figure 5:
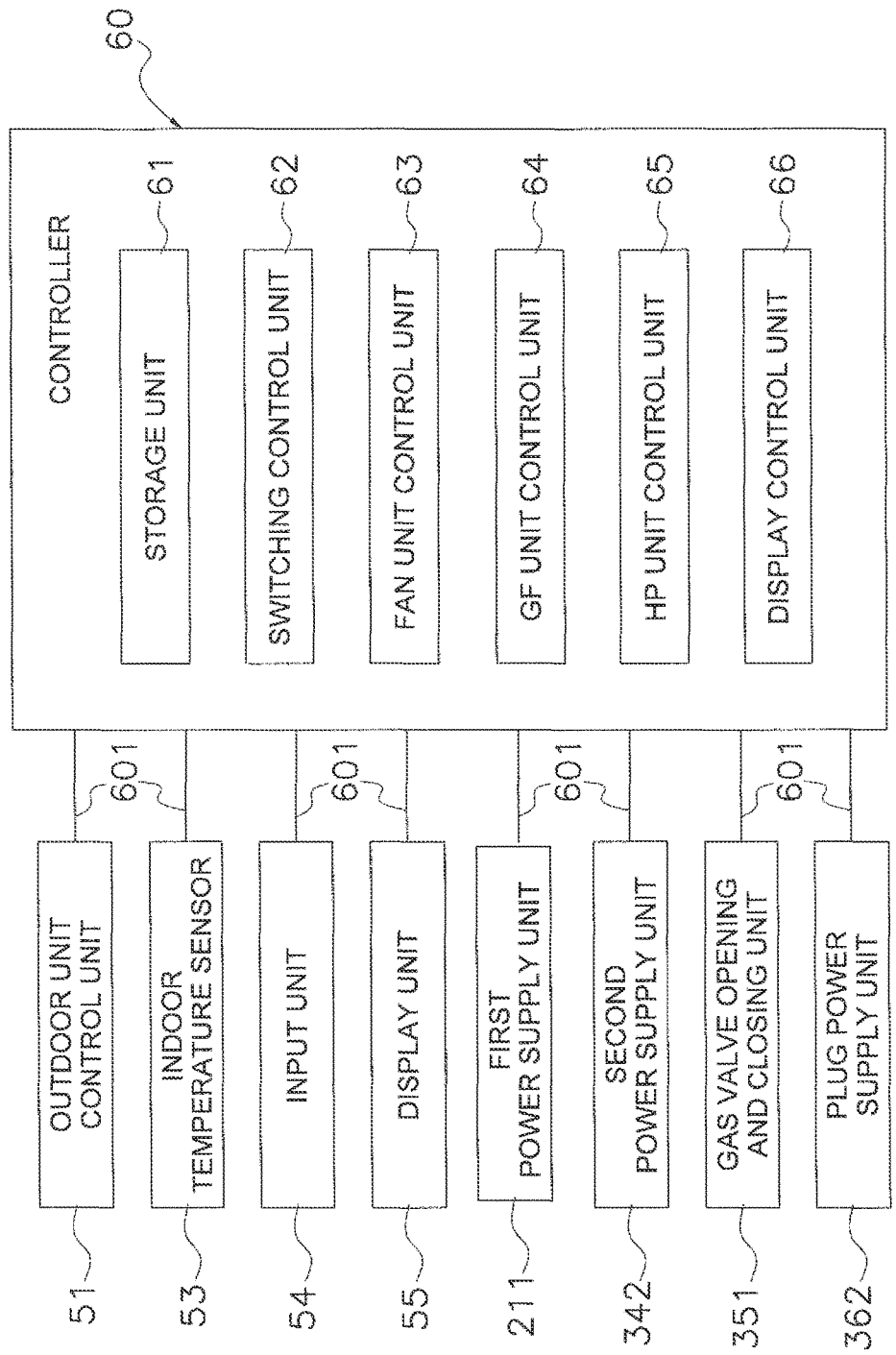
FIG. 5 is a schematic diagram showing the configuration of a controller and devices connected to the controller.

FIG. 5 is a schematic diagram showing the schematic configuration of the controller 60 and devices connected to the controller 60. The controller 60 is mainly connected via the cables 601 to the outdoor unit control unit 51, the indoor temperature sensor 53, the input unit 54, the display unit 55, the first power supply unit 211, the second power supply unit 342, the gas valve opening and closing unit 351, and the plug power supply unit 362.

The controller 60 mainly includes a storage unit 61, a switching control unit 62, a fan unit control unit 63, a gas furnace unit control unit (hereinafter abbreviated as GF unit control unit) 64, a heat pump unit control unit (hereinafter abbreviated as HP unit control unit) 65, and a display control unit 66. These will be described below.

(3-1) Storage Unit 61

The storage unit 61 retains a control program that is executed in the switching control unit 62, the fan unit control unit 63, the GF unit control unit 64, the HP unit control unit 65, and the display control unit 66. Furthermore, the storage unit 61 retains, as the indoor temperature Ti, the digital signal sent from the indoor temperature sensor 53 every predetermined period (e.g., 1 minute). Furthermore, the storage unit 61 receives and retains, as the outside air temperature To, the outside air temperature information sent from the outdoor unit control unit 51 every predetermined period (e.g., 1 minute). Furthermore, the storage unit 61 receives and retains, as an evaporation temperature Te, the refrigerant temperature information sent from the outdoor unit control unit 51 every predetermined period (e.g., 1 minute). Furthermore, the storage unit 61 deciphers instruction signals sent from the input unit 54 and extracts and retains, for example, a "start operation" instruction, a "stop operation" instruction, a preset temperature Tp and the like.

(3-2) Switching Control Unit 62

Figure 6:
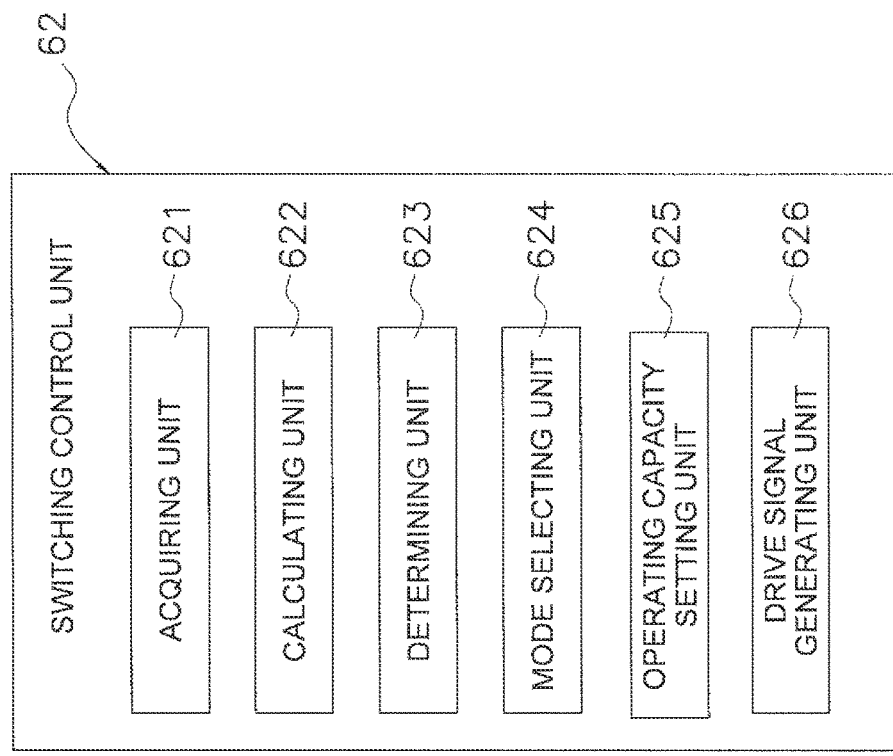
FIG. 6 is a schematic diagram showing the configuration of a switching control unit.

FIG. 6 is a schematic diagram showing the configuration of the switching control unit 62. The switching control unit 62 performs control relating to the selection or switching of the heat source unit of the heating system 10. Details about the selection or switching of the heat source unit by the switching control unit 62 will be described under the heading "(4) Flow of Processing by Switching Control Unit 62" below. The switching control unit 62 mainly has an acquiring unit 621, a calculating unit 622, a determining unit 623, a mode selecting unit 624, an operating capacity setting unit 625, and a drive signal generating unit 626.

(3-2-1) Acquiring Unit 621

When power is switched on, the acquiring unit 621 first acquires the control program from the storage unit 61. Next, the acquiring unit 621 acquires the user instruction from the storage unit 61 in accordance with the control program. Specifically, when the "start operation" instruction or the "stop operation" instruction is stored in the storage unit 61, the acquiring unit 621 acquires this in real time. When the acquiring unit 621 acquires the "stop operation" instruction, it outputs this to the drive signal generating unit 626.

Furthermore, the acquiring unit 621 acquires the outside air temperature To, the indoor temperature Ti, and the preset temperature Tp from the storage unit 61 at a predetermined timing in accordance with the control program. Specifically, the acquiring unit 621 acquires the outside air temperature To, the indoor temperature Ti, and the preset temperature Tp when it acquires the "start operation" instruction and when it acquires a "prohibit switching" signal (described later), a GF unit drive signal (described later), an HP unit drive signal (described later), and a "suspend operation" signal (described later). The acquiring unit 621 outputs the acquired outside air temperature To to the determining unit 623. Furthermore, the acquiring unit 621 outputs the acquired outside air temperature To, the indoor temperature Ti, and the preset temperature Tp to the calculating unit 622.

(3-2-2) Calculating Unit 622

When the calculating unit 622 receives the indoor temperature Ti and the preset temperature Tp that have been output from the acquiring unit 621, it calculates a first difference value Dv1, which is a value obtained by subtracting the indoor temperature Ti from the preset temperature Tp, and a second difference value Dv2, which is a value obtained by subtracting the preset temperature Tp from the indoor temperature Ti, in accordance with the control program. The calculating unit 622 outputs the calculated first difference value Dv1 and second difference value Dv2 to the determining unit 623.

Furthermore, when the calculating unit 622 receives an "allow switching" signal (described later) that is output from the determining unit 623, it calculates a heat load on the basis of the outside air temperature To, the indoor temperature Ti, and the preset temperature Tp. Additionally, the calculating unit 622 outputs the calculated heat load to the operating capacity setting unit 625. A computational equation, a table and the like for calculating the heat load from the outside air temperature To, the indoor temperature Ti, and the preset temperature Tp are programmed in the control program, and the calculating unit 622 calculates the heat load in accordance with the control program.

Furthermore, when the calculating unit 622 receives a third operating mode selection signal from the mode selecting unit 624, it calculates, on the basis of the calculated heat load, a first cost Gc in the case of driving the GF unit 30 and a second cost Hc in the case of driving the HP unit 40. Specifically, a computational equation, a table and the like having defined correlations between the heat load, the energy consumed by the GF unit 30 and the HP unit 40 per unit of time, and commercial power and commercial gas usage rates per unit of time are programmed in the control program. The first cost Gc and the second cost Hc are calculated in accordance with the control program. The calculating unit 622 outputs the calculated first cost Gc and second cost Hc to the determining unit 623.

(3-2-3) Determining Unit 623

The determining unit 623 performs various determinations in accordance with the control program at a predetermined timing. The determinations performed by the determining unit 623 will be described below.

(3-2-3-1) Indoor Temperature Determination

When the determining unit 623 receives the first difference value Dv1 that has been output from the calculating unit 622, it performs an indoor temperature determination that is a determination of whether or not the first difference value Dv1 is equal to or greater than a predetermined preset value Pv1. In a case where the first difference value Dv1 is less than the preset value Pv1, the determining unit 623 judges that the indoor temperature Ti is high enough for the heating operation to be unnecessary and outputs an "indoor temperature: high" determination signal indicating this to the drive signal generating unit 626. In a case where, as a result of the indoor temperature determination, the first difference value Dv1 is equal to or greater than the preset value Pv1, the determining unit 623 judges that the indoor temperature Ti is not high enough for the heating operation to be unnecessary and performs a subsequent switching allowance determination (described later). The preset value Pv1 is preset in the control program. In the present embodiment, the preset value Pv1 is set to −5 (° C.).

(3-2-3-2) Switching Allowance Determination

The determining unit 623 has a timer function for counting time. The determining unit 623 starts counting time when it receives a predetermined signal. Specifically, the determining unit 623 starts counting time when it receives the "start operation" instruction that is output from the acquiring unit 621. Furthermore, when the determining unit 623 receives the "stop operation" instruction that is output from the acquiring unit 621, it resets a count time Ct it has counted until then and stops counting time.

When, in the indoor temperature determination, the first difference value Dv1 was equal to or greater than the preset value Pv1, the determining unit 623 performs a switching allowance determination in which it determines whether or not the count time Ct is equal to or greater than a set time St. Additionally, if, as a result of the switching allowance determination, the count time Ct is less than the set time St, the determining unit 623 outputs a "prohibit switching" signal to the acquiring unit 621. If the count time Ct is equal to or greater than the set time St, the determining unit 623 outputs a "allow switching" signal to the calculating unit 622 and performs a subsequent outside air temperature determination (described later). As for the set time St, an appropriate value is set in the control program. In the present embodiment, the set time St is set to 30 minutes.

(3-2-3-3) Outside Air Temperature Determination

If, as a result of the switching allowance determination, the count time Ct is equal to or greater than the set time St, the determining unit 623 performs an outside air temperature determination in which it determines whether or not the outside air temperature To that has been output from the acquiring unit 621 is equal to or greater than a predetermined first standard value Sv1 and whether or not the outside air temperature To is less than a second standard value Sv2.

The first standard value Sv1 is preset in the control program as a value meeting the condition that if the outside air temperature To is less than the first standard value Sv1, causing the GF unit 30 to operate as a heat source unit will result in a superior COP than causing the HP unit 40 to operate as a heat source unit. In the present embodiment, the first standard value Sv1 is set to −11 (° C.).

Furthermore, the second standard value Sv2 is preset in the control program as a value meeting the condition that if the outside air temperature To is equal to or greater than the second standard value Sv2, causing the HP unit 40 to operate as a heat source unit will result in a superior COP than causing the GF unit 30 to operate as a heat source unit. In the present embodiment, the second standard value Sv2 is set to −2 (° C.), which is higher than the first standard value Sv1.

In a case where, as a result of the outside air temperature determination, the outside air temperature To is less than the first standard value Sv1, the determining unit 623 outputs an "outside air temperature: low" determination signal indicating this to the mode selecting unit 624. Furthermore, in a case where the outside air temperature To is equal to or greater than the second standard value Sv2, the determining unit 623 outputs an "outside air temperature: high" determination signal indicating this to the mode selecting unit 624. Furthermore, in a case where the outside air temperature To is equal to or greater than the first standard value Sv1 and less than the second standard value Sv2, the determining unit 623 outputs an "outside air temperature: intermediate" determination signal indicating this to the mode selecting unit 624.

(3-2-3-4) Difference Value Determination

When the determining unit 623 receives a third operating mode selection signal (described later) from the mode selecting unit 624, it performs a difference value determination that is a determination of whether or not the first difference value Dv1 and the second difference value Dv2 that have been output from the calculating unit 622 are equal to or greater than predetermined threshold values.

Specifically, in a case where the first difference value Dv1 is equal to or greater than a first threshold value ΔTh1, the determining unit 623 judges that the indoor temperature Ti is far below the preset temperature Tp and outputs a "first difference value: large" determination signal indicating this to the operating capacity setting unit 625.

In a case where the first difference value Dv1 is less than the first threshold value ΔTh1, the determining unit 623 outputs a "first difference value: small" determination signal indicating this to the operating capacity setting unit 625 and determines whether or not the second difference value Dv2 is equal to or greater than a second threshold value ΔTh2. Additionally, when the determining unit 623 judges that the second difference value Dv2 is equal to or greater than the second threshold value ΔTh2, it outputs a "second difference value: large" determination signal indicating this to the operating capacity setting unit 625. Furthermore, when the determining unit 623 judges that the second difference value Dv2 is less than the second threshold value ΔTh2, it outputs a "second difference value: small" determination signal indicating this to the operating capacity setting unit 625.

The first threshold value ΔTh1 and the second threshold value ΔTh2 are preset in the control program. In the present embodiment, the first threshold value ΔTh1 is set to 10 (° C.) and the second threshold value ΔTh2 is set to 1 (° C.).

(3-2-3-5) Cost Determination

Furthermore, when the determining unit 623 receives the first cost Gc and the second cost Hc that are output from the calculating unit 622, it performs a cost determination in which it compares the first cost Gc and the second cost Hc. In a case where, as a result of the cost determination, the first cost Gc is higher than the second cost Hc, the determining unit 623 outputs a "first cost: high" determination signal indicating this to the operating capacity setting unit 625. In a case where, as a result of the cost determination, the first cost Gc is not higher than the second cost Hc, the determining unit 623 outputs a "first cost: low" determination signal indicating this to the mode selecting unit 624.

(3-2-4) Mode Selecting Unit 624

The mode selecting unit 624 performs an operating mode selection in accordance with the "outside air temperature: low" determination signal, the "outside air temperature: intermediate" determination signal, or the "outside air temperature: high" determination signal that is output from the determining unit 623. Correlations between the operating modes to be selected and the "outside air temperature: low" determination signal, the "outside air temperature: intermediate" determination signal, and the "outside air temperature: high" determination signal are defined in the control program. The mode selecting unit 624 performs the operating mode selection in accordance with the control program.

Specifically, when the mode selecting unit 624 receives the "outside air temperature: low" determination signal, it selects the first operating mode and outputs a first operating mode selection signal indicating this to the operating capacity setting unit 625 and the drive signal generating unit 626. Furthermore, when the mode selecting unit 624 receives the "outside air temperature: high" determination signal, it selects the second operating mode and outputs a second operating mode selection signal indicating this to the operating capacity setting unit 625 and the drive signal generating unit 626. Furthermore, when the mode selecting unit 624 receives the "outside air temperature: intermediate" determination signal, it selects the third operating mode and outputs the third operating mode selection signal indicating this to the determining unit 623.

(3-2-5) Operating Capacity Setting Unit 625

When the operating capacity setting unit 625 receives predetermined signals, it sets the operating capacity of the heat source unit to be operated on the basis of the heat load that is output from the calculating unit 622. Specifically, in a case where the operating capacity setting unit 625 receives the first operating mode selection signal, it sets the operating capacity of the GF unit 30 in accordance with the heat load. Furthermore, in a case where the operating capacity setting unit 625 receives the second operating mode selection signal, it sets the operating capacity of the HP unit 40 in accordance with the heat load. Correlations between heat loads and operating capacities of the heat source unit are defined in the control program. In a case where the mode selecting unit 624 receives the first operating mode selection signal or the second operating mode selection signal, it sets the operating capacity in accordance with the control program.

Furthermore, in a case where the operating capacity setting unit 625 receives the "first difference value: large" determination signal, the "first difference value: small" determination signal, the "second difference value: large" determination signal, or the "second difference value: small" determination signal that has been output from the determining unit 623, it sets the operating capacity of the heat source unit in the case of operating in the third operating mode.

More specifically, when the operating capacity setting unit 625 receives the "first difference value: large" determination signal or the "first difference value: small" determination signal, it calculates a first load Gl that is the heat load processed by the GF unit 30. Then, the operating capacity setting unit 625 sets the operating capacity of the GF unit 30 on the basis of the calculated first load Gl. Furthermore, when the operating capacity setting unit 625 receives the "second difference value: large" determination signal or the "second difference value: small" determination signal, it calculates a second load Hl that is the heat load processed by the HP unit 40. Then, the operating capacity setting unit 625 sets the operating capacity of the HP unit 40 on the basis of the calculated second load Hl.

A logic for calculating the first load Gl and the second load Hl on the basis of the heat load that is output from the calculating unit 622 is programmed in the control program. Furthermore, a correlation between the first load Gl and the operating capacity of the GF unit 30 and a correlation between the second load Hl and the operating capacity of the HP unit 40 are also defined in the control program.

In the present embodiment, in a case where, during the third operating mode, the heat load that is output from the calculating unit 622 is large, in the operating capacity setting unit 625 the first load Gl processed by the GF unit 30 is calculated larger than the second load Hl processed by the HP unit 40. Because of this, the operating capacity of the GF unit 30 is set to a larger level than the operating capacity of the HP unit 40, and the amount of time required for heat load processing is shortened.

Furthermore, in a case where, during the third operating mode, the heat load that is output from the calculating unit 622 is not large, in the operating capacity setting unit 625 the second load Hl processed by the HP unit 40 is calculated larger than the first load Gl processed by the GF unit 30. Because of this, the operating capacity of the HP unit 40 is set to a larger level than the operating capacity of the GF unit 30, and the indoor temperature Ti is kept from exceeding the preset temperature Tp and rising even higher.

Furthermore, the first load Gl is calculated larger and the level of the operating capacity of the GF unit 30 is set larger when the operating capacity setting unit 625 receives the "first difference value: large" determination signal than when the operating capacity setting unit 625 receives the "first difference value: small" determination signal. In other words, when the first difference value Dv1 is less than the first threshold value $\Delta Th1$, the level of the operating capacity of the GF unit 30 is set lower than when the first difference value Dv1 is equal to or greater than the first threshold value $\Delta Th1$.

Furthermore, the second load Hl is calculated larger and the level of the operating capacity of the HP unit 40 is set larger when the operating capacity setting unit 625 receives the "first difference value: large" determination signal or the "second difference value: small" determination signal than when the operating capacity setting unit 625 receives the "second difference value: large" determination signal. In other words, when the second difference value Dv2 is equal to or greater than the second threshold value $\Delta Th2$, the level of the operating capacity of the GF unit 30 is set lower than when the second difference value Dv2 is less than the second threshold value $\Delta Th2$.

When the operating capacity setting unit 625 completes setting the operating capacity of the GF unit 30, it outputs a GF capacity setting signal indicating the level of the set operating capacity to the drive signal generating unit 626. Furthermore, when the operating capacity setting unit 625 completes setting the operating capacity of the HP unit 40, it outputs an HP capacity setting signal indicating the level of the set operating capacity to the drive signal generating unit 626.

(3-2-6) Drive Signal Generating Unit 626

The drive signal generating unit 626 generates and outputs, to each unit, various signals in accordance with the control program.

Specifically, when the drive signal generating unit 626 receives the "stop operation" instruction that has been output from the acquiring unit 621, it outputs a "stop operation" signal to the fan unit control unit 63, the GF unit control unit 64, the HP unit control unit 65, and the display control unit 66 in order to stop the heating operation.

Furthermore, when the drive signal generating unit 626 receives the first operating mode selection signal that has been output from the mode selecting unit 624, it outputs a heat pump unit stop signal (hereinafter abbreviated as HP unit stop signal) to the HP unit control unit 65 in order to stop the operation of the HP unit 40.

Furthermore, when the drive signal generating unit 626 receives the second operating mode selection signal that has been output from the mode selecting unit 624, it outputs a gas furnace unit stop signal (hereinafter abbreviated as GF unit stop signal) to the GF unit control unit 64 in order to stop the operation of the GF unit 30.

Furthermore, when the drive signal generating unit 626 receives the "indoor temperature: high" determination signal that has been output from the determining unit 623, it outputs a "suspend operation" signal to the acquiring unit 621, the fan unit control unit 63, the GF unit control unit 64, the HP unit control unit 65, and the display control unit 66 in order to suspend the heating operation.

Furthermore, when the drive signal generating unit 626 receives the GF capacity setting signal that has been output from the operating capacity setting unit 625, it outputs the GF capacity setting signal together with a gas furnace unit drive signal (hereinafter abbreviated as GF unit drive signal) to the GF unit control unit 64 and outputs the GF unit drive signal to the acquiring unit 621.

Furthermore, when the drive signal generating unit 626 receives the HP capacity setting signal that has been output from the operating capacity setting unit 625, it outputs the HP capacity setting signal together with a heat pump unit drive signal (hereinafter abbreviated as HP unit drive signal) to the HP unit control unit 65 and outputs the HP unit drive signal to the acquiring unit 621.

(3-3) Fan Unit Control Unit 63

When power is switched on, the fan unit control unit 63 first acquires the control program from the storage unit 61. Next, the fan unit control unit 63 acquires the user instruction from the storage unit 61 in accordance with the control program. Specifically, when the "start operation" instruction or the "stop operation" instruction is stored in the storage unit 61, the fan unit control unit 63 acquires this in real time.

When the fan unit control unit 63 acquires the "start operation" instruction, it sends a signal to the first power supply unit 211 to start supplying power to the first fan motor M21. Because of this, the first fan motor M21 starts driving, and the fan unit 20 goes into operation. Furthermore, when the fan unit control unit 63 acquires the "stop operation" instruction, it sends a signal to the first power supply unit 211 to stop supplying power to the first fan motor M21. Because of this, the first fan motor M21 stops driving, and the fan unit 20 stops operating.

Furthermore, when the fan unit control unit 63 receives the "suspend operation" signal that is output from the drive signal generating unit 626, it sends a signal to the first power supply unit 211 to suspend the supply of power to the first fan motor M21. Because of this, the first fan motor M21 suspends driving, and the fan unit 20 goes into suspension in which operation is suspended. When the fan unit control unit 63 receives the "suspend operation" signal in a case where the fan unit 20 is already in suspension, the fan unit control unit 63 does nothing.

(3-4) GF Unit Control Unit 64

When power is switched on, the GF unit control unit 64 acquires the control program from the storage unit 61. The GF unit control unit 64 generates and sends, to each unit, signals according to the control program.

Specifically, when the GF unit control unit 64 receives the GF unit drive signal that is output from the drive signal generating unit 626, it performs GF unit drive control that causes the GF unit 30 to operate as a heat source unit. That is, in the GF unit drive control, the GF unit control unit 64 first sends a signal to the second power supply unit 342 to start supplying power to the second fan motor. Furthermore, together with this, the GF unit control unit 64 sends a signal to the gas valve opening and closing unit 351 to open the gas valve 35. Thereafter, the GF unit control unit 64 sends a signal to the plug power supply unit 362 to cause the plug 361 to produce an electrical discharge for a predetermined amount of time. Because of this, the driving of the second fan motor is started, the fan 34 goes into operation, the combustion gas is generated in the combustion unit 36, and the GF unit 30 becomes driven. When the GF unit control unit 64 receives the GF unit drive signal in a state in which the GF unit 30 is already operating as a heat source unit, the GF unit control unit 64 does nothing.

Furthermore, when the GF unit control unit 64 receives the GF capacity setting signal that is output from the drive signal generating unit 626, it performs GF unit intermittent drive control that causes the GF unit 30 to intermittently operate. That is, in the GF unit intermittent drive control, the GF unit control unit 64 sends a signal to the gas valve opening and closing unit 351 at a predetermined timing to close the gas valve 35. Thereafter, the GF unit control unit 64 sends a signal to the gas valve opening and closing unit 351 at a predetermined timing to open the gas valve 35 and then sends a signal to the plug power supply unit 362 to cause the plug 361 to produce an electrical discharge. Because of this, the GF unit 30 becomes intermittently driven to repeatedly start and stop at a predetermined timing, and the combustion unit 36 is driven at the operating capacity designated by the GF capacity setting signal.

A table having a defined correlation between the level of the operating capacity designated in the GF capacity setting signal and the timing when the gas valve 35 is opened and closed in the intermittent drive control is programmed in the control program. The GF unit control unit 64 performs the GF unit intermittent drive control on the basis of the table. Furthermore, when the GF unit control unit 64 receives the GF capacity setting signal in a case where the GF unit 30 is being intermittently driven, it references the table again and updates the intermittent drive control.

Furthermore, when the GF unit control unit 64 receives the GF unit stop signal that is output from the drive signal generating unit 626, it performs GF unit stop control that causes the GF unit 30 to stop operating as a heat source unit. That is, in the GF unit stop control, the GF unit control unit 64 first sends a signal to the gas valve opening and closing unit 351 to close the gas valve 35. Thereafter, the GF unit control unit 64 sends a signal to the second power supply unit 342 to stop supplying power to the second fan motor. Because of this, the driving of the second fan motor is stopped, the fan 34 is stopped, the generation of the combustion gas in the combustion unit 36 is stopped, and the GF unit 30 stops operating as a heat source unit. When the GF unit control unit 64 receives the GF unit stop signal in a state in which the GF unit 30 is not operating as a heat source unit, the GF unit control unit 64 does nothing.

(3-5) HP Unit Control Unit 65

When power is switched on, the HP unit control unit 65 acquires the control program from the storage unit 61. The HP unit control unit 65 generates and sends, to each unit, signals according to the control program.

Specifically, when the HP unit control unit 65 receives the HP capacity setting signal and the HP unit drive signal that are output from the drive signal generating unit 626, it performs HP unit drive control and HP unit capacity control that cause the HP unit 40 to operate as a heat source unit.

That is, in the HP unit drive control, the HP unit control unit 65 sends a signal to the outdoor unit control unit 51 to cause the outdoor fan power supply unit to start supplying power so that the outdoor fan motor M46 starts driving. Furthermore, together with this, the HP unit control unit 65 sends a signal to the outdoor unit control unit 51 to open the expansion valve 49 at an appropriate opening degree.

Furthermore, in the HP unit capacity control, the HP unit control unit 65 decides the rotating speed of the compressor motor M45 on the basis of the level of the operating capacity of the HP unit included in the HP capacity setting signal. Additionally, the HP unit control unit 65 sends a signal to the outdoor unit control unit 51 to cause the inverter to supply power so that the compressor motor M45 is driven at the decided rotating speed. A table having a defined correlation between the level of the operating capacity designated in the HP capacity setting signal and the rotating speed of the compressor motor M45 is programmed in the control program. The HP unit control unit 65 performs the HP unit capacity control on the basis of the table.

Because of the HP unit drive control and the HP unit capacity control, the vapor compression refrigeration cycle functions in the HP unit 40, and the HP unit 40 operates as a heat source unit at the designated operating capacity. When the HP unit control unit 65 receives the HP unit drive signal in a state in which the HP unit 40 is already operating as a heat source unit, the HP unit control unit 65 does nothing. Furthermore, when the HP unit control unit 65 receives the HP capacity setting signal in a case where the HP unit 40 is being driven, it references the table again, updates the rotating speed of the compressor M45, and sends a signal to the outdoor unit control unit 51 to cause the inverter to supply power so that the compressor motor M45 is driven at the updated rotating speed.

Furthermore, when the HP unit control unit 65 receives the HP unit stop signal that is output from the drive signal generating unit 626, it performs HP unit stop control that causes the HP unit 40 to stop operating as a heat source unit. That is, in the HP unit stop control, the HP unit control unit 65 sends a signal to the outdoor unit control unit 51 to stop supplying power to the compressor motor M45 and the outdoor fan motor M46. Furthermore, together with this, the HP unit control unit 65 sends a signal to the outdoor unit control unit 51 to close the expansion valve 49. Because of this, the HP unit 40 stops operating as a heat source unit. When the HP unit control unit 65 receives the HP unit stop signal in a state in which the HP unit 40 is not operating as a heat source unit, the HP unit control unit 65 does nothing.

(3-6) Display Control Unit 66

When power is switched on, the display control unit 66 first acquires the control program from the storage unit 61. Next, the display control unit 66 acquires the user instruction, the indoor temperature Ti, the preset temperature Tp and the like from the storage unit 61. Specifically, when the "start operation" instruction or the "stop operation" instruction, the indoor temperature Ti, and the preset temperature Tp are stored in the storage unit 61, the display control unit 66 acquires these in real time.

When the display control unit 66 acquires the "start operation" instruction, it sends to the display unit 55 display data indicating that the heating system 10 is in operation as well as the current indoor temperature Ti, the preset temperature Tp and the like. Because of this, the display unit 55 displays to the user the fact that the heating system 10 is in operation as well as the current indoor temperature Ti, the preset temperature Tp and the like. Furthermore, when the display control unit 66 acquires the "stop operation" instruction, it sends to the display unit 55 a signal that stops the display. Because of this, the display is no longer performed on the display unit 55.

Furthermore, when the display control unit 66 receives the "suspend operation" signal that is output from the drive signal generating unit 626, it sends to the display unit 55 display data indicating that the heating system 10 is on standby. Because of this, the display unit 55 displays to the user the fact that the heating system 10 is on standby. When the display control unit 66 receives the "suspend operation" signal in a state in which the display unit 55 is displaying the fact that the heating system 10 is on standby, the display control unit 66 does nothing.

(4) Flow of Processing by Switching Control Unit 62

Figure 7:
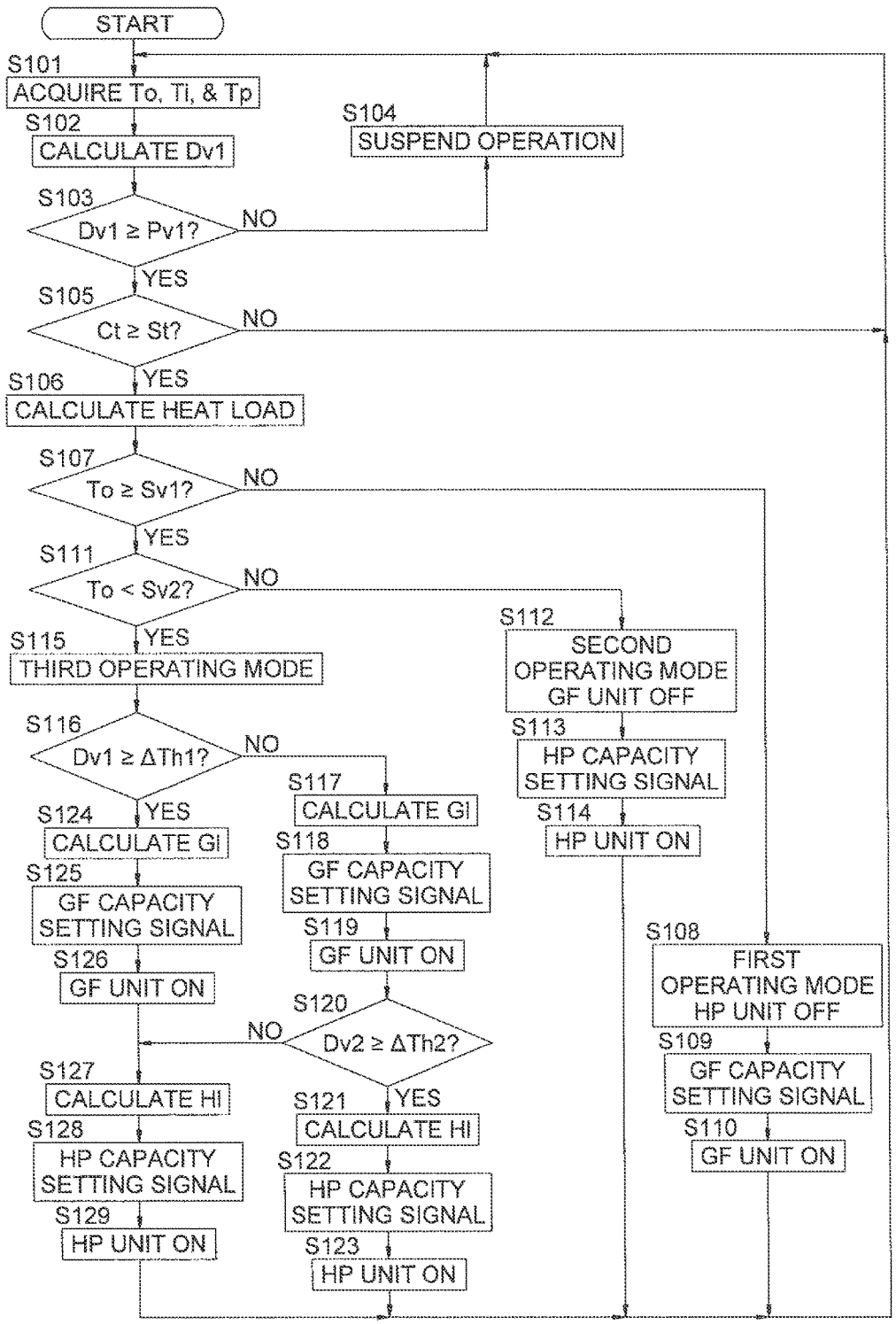
FIG. 7 is a flowchart showing a flow of processing by the switching control unit.

An example of a flow of processing by the switching control unit 62 will be described below with reference to FIG. 7. FIG. 7 is a flowchart showing a flow of processing by the switching control unit 62. What follows is an example of processing, and the switching control unit 62 may also execute processing with a flow different from this. In the present embodiment, when power to the heating system 10 is switched on and the "start operation" instruction is input, the switching control unit 62 performs processing with a flow such as shown in FIG. 7.

In step S101, the acquiring unit 621 acquires the outside air temperature To, the indoor temperature Ti, and the preset temperature Tp from the storage unit 61. Then, the acquiring unit 621 outputs the acquired outside air temperature To to the determining unit 623. Furthermore, the acquiring unit 621 outputs the acquired outside air temperature To, indoor temperature Ti, and preset temperature Tp to the calculating unit 622. Then, the switching control unit 62 proceeds to step S102.

In step S102, the calculating unit 622 receives the indoor temperature Ti and preset temperature Tp that have been output from the acquiring unit 621. Also, the calculating unit 622 calculates the first difference value Dv1, which is a value obtained by subtracting the indoor temperature Ti from the preset temperature Tp, and outputs the first difference value Dv1 to the determining unit 623. Thereafter, the switching control unit 62 proceeds to step S103.

In step S103, the determining unit 623 receives the first difference value Dv1 that has been output from the calculating unit 622 and performs the indoor temperature determination. In a case where, as a result of the indoor temperature determination, the determination is NO (that is, in a case where the first difference value Dv1 is less than the preset value Pv1), the determining unit 623 outputs the "indoor temperature: high" determination signal to the drive signal generating unit 626. Then, the switching control unit 62 proceeds to step S104. In a case where the determination is YES (that is, in a case where the first difference value Dv1 is equal to or greater than the preset value Pv1), the switching control unit 62 proceeds to step S105.

In step S104, the drive signal generating unit 626 receives the "indoor temperature: high" determination signal that has been output from the determining unit 623 and outputs the "suspend operation" signal to each unit. Thereafter, the switching control unit 62 returns to step S101.

In step S105, the determining unit 623 performs the switching allowance determination. Then, in a case where, as a result of the switching allowance determination, the determination is NO (that is, in a case where the count time Ct is less than the set time St), the determining unit 623 outputs the "prohibit switching" signal to the acquiring unit 621. Then, the switching control unit 62 returns to step S101. In a case where the determination is YES (that is, in a case where the count time Ct is equal to or greater than the set time St), the determining unit 623 outputs the "allow switching" signal to the calculating unit 622. Then, the switching control unit 62 proceeds to step S106.

In step S106, the calculating unit 622 receives the "allow switching" signal that has been output from the determining unit 623 and calculates the heat load on the basis of the outside air temperature To, the indoor temperature Ti, and the preset temperature Tp. Then, the calculating unit 622 outputs the calculated heat load to the operating capacity setting unit 625, and the switching control unit 62 proceeds to step S107.

In step S107, the determining unit 623 performs the outside air temperature determination in which it determines whether or not the outside air temperature To is equal to or greater than the first standard value Sv1. In a case where, as a result of the outside air temperature determination, the determination is NO (that is, in a case where the outside air temperature To is less than the first standard value Sv1), the determining unit 623 outputs the "outside air temperature: low" determination signal to the mode selecting unit 624. Then, the switching control unit 62 proceeds to step S108. In a case where the determination is YES (that is, in a case where the outside air temperature To is equal to or greater than the first standard value Sv1), the switching control unit 62 proceeds to step S111.

In step S108, the mode selecting unit 624 receives the "outside air temperature: low" determination signal that has been output from the determining unit 623, selects the first operating mode, and outputs the first operating mode selection signal indicating this to the operating capacity setting unit 625 and the drive signal generating unit 626. Then, the drive signal generating unit 626 receives the first operating mode selection signal that has been output from the mode selecting unit 624 and outputs the HP unit stop signal to the HP unit control unit 65. Then, the switching control unit 62 proceeds to step S109.

In step S109, the operating capacity setting unit 625 receives the first operating mode selection signal that has been output from the mode selecting unit 624 and sets the operating capacity of the GF unit 30 on the basis of the heat load that is output from the calculating unit 622. Then, the operating capacity setting unit 625 outputs the GF capacity setting signal indicating the level of the set operating capacity to the drive signal generating unit 626. Then, the switching control unit 62 proceeds to step S110.

In step S110, the drive signal generating unit 626 receives the GF capacity setting signal that has been output from the operating capacity setting unit 625 and outputs the GF capacity setting signal together with the GF unit drive signal to the GF unit control unit 64. Furthermore, the drive signal generating unit 626 outputs the GF unit drive signal to the acquiring unit 621. Then, the switching control unit 62 returns to step S101.

In step S111, the determining unit 623 performs the outside air temperature determination in which it determines whether or not the outside air temperature To is less than the second standard value Sv2. In a case where, as a result of the outside air temperature determination, the determination is NO (that is, in a case where the outside air temperature To is equal to or greater than the second standard value Sv2), the determining unit 623 outputs the "outside air temperature: high" determination signal to the mode selecting unit 624. Then, the switching control unit 62 proceeds to step S112. In a case where the determination is YES (that is, in a case where the outside air temperature To is less than the second standard value Sv2), the determining unit 623 outputs the "outside air temperature: intermediate" determination signal to the mode selecting unit 624. Then, the switching control unit 62 proceeds to step S115.

In step S112, the mode selecting unit 624 receives the "outside air temperature: high" determination signal that has been output from the determining unit 623, selects the second operating mode, and outputs the second operating mode selection signal indicating this to the operating capacity setting unit 625 and the drive signal generating unit 626. Then, the drive signal generating unit 626 receives the second operating mode selection signal that has been output from the mode selecting unit 624 and outputs the GF unit stop signal to the GF unit control unit 64. Then, the switching control unit 62 proceeds to step S113.

In step S113, the operating capacity setting unit 625 receives the second operating mode selection signal that has been output from the mode selecting unit 624 and sets the operating capacity of the HP unit 40 on the basis of the heat load that is output from the calculating unit 622. Then, the operating capacity setting unit 625 outputs the HP capacity setting signal indicating the level of the set operating capacity to the drive signal generating unit 626. Then, the switching control unit 62 proceeds to step S114.

In step S114, the drive signal generating unit 626 receives the HP capacity setting signal that has been output from the operating capacity setting unit 625 and outputs the HP capacity setting signal together with the HP unit drive signal to the HP unit control unit 65. Furthermore, the drive signal generating unit 626 outputs the HP unit drive signal to the acquiring unit 621. Then, the switching control unit 62 returns to step S101.

In step S115, the mode selecting unit 624 receives the "outside air temperature: intermediate" determination signal that has been output from the determining unit 623, selects the third operating mode, and outputs the third operating mode selection signal to the determining unit 623. Then, the switching control unit 62 proceeds to step S116.

In step S116, the determining unit 623 receives the third operating mode selection signal and performs the difference value determination in which it determines whether or not the first difference value Dv1 that has been output from the calculating unit 622 is equal to or greater than the first threshold value ΔTh1. In a case where, as a result of the difference value determination, the determination is NO (that is, in a case where the first difference value Dv1 is less than the first threshold value ΔTh1), the determining unit 623 outputs the "first difference value: small" determination signal to the operating capacity setting unit 625. Then, the switching control unit proceeds to step S117. In a case where the determination is YES (that is, in a case where the first difference value Dv1 is equal to or greater than the first threshold value ΔTh1), the determining unit 623 outputs the "first difference value: large" determination signal to the operating capacity setting unit 625. Then, the switching control unit 62 proceeds to step S124.

In step S117, the operating capacity setting unit 625 receives the "first difference value: small" determination signal that has been output from the determining unit 623 and calculates the first load Gl. Then, the switching control unit 62 proceeds to step S118.

In step S118, the operating capacity setting unit 625 sets the operating capacity of the GF unit 30 on the basis of the calculated first load Gl. Furthermore, the operating capacity setting unit 625 outputs the GF capacity setting signal indicating the level of the set operating capacity to the drive signal generating unit 626. Then, the switching control unit 62 proceeds to step S119.

In step S119, the drive signal generating unit 626 receives the GF capacity setting signal that has been output from the operating capacity setting unit 625 and outputs the GF capacity setting signal together with the GF unit drive signal to the GF unit control unit 64. Then, the switching control unit 62 proceeds to step S120.

In step S120, the determining unit 623 performs the difference value determination in which it determines whether or not the second difference value Dv2 that has been output from the calculating unit 622 is equal to or greater than the second threshold value ΔTh2. In a case where, as a result of the difference value determination, the determination is NO (that is, in a case where the second difference value Dv2 is less than the second threshold value ΔTh2), the determining unit 623 outputs the "second difference value: small" determination signal to the operating capacity setting unit 625. Then, the switching control unit 62 proceeds to step S127. In a case where the determination is YES (that is, in a case where the second difference value Dv2 is equal to or greater than the second threshold value ΔTh2), the determining unit 623 outputs the "second difference value: large" determination signal to the operating capacity setting unit 625. Then, the switching control unit 62 proceeds to step S121.

In step S121, the operating capacity setting unit 625 receives the "second difference value: large" determination signal that has been output from the determining unit 623 and calculates the second load Hl. Then, the switching control unit 62 proceeds to step S122.

In step S122, the operating capacity setting unit 625 sets the operating capacity of the HP unit 40 on the basis of the calculated second load Hl. Furthermore, the operating capacity setting unit 625 outputs the HP capacity setting signal indicating the level of the set operating capacity to the drive signal generating unit 626. Then, the switching control unit 62 proceeds to step S123.

In step S123, the drive signal generating unit 626 receives the HP capacity setting signal that has been output from the operating capacity setting unit 625 and outputs the HP capacity setting signal together with the HP unit drive signal to the HP unit control unit 65. Furthermore, the drive signal generating unit 626 outputs the HP unit drive signal to the acquiring unit 621. Then, the switching control unit 62 returns to step S101.

In step S124, the operating capacity setting unit 625 receives the "first difference value: large" determination signal that has been output from the determining unit 623 and calculates the first load Gl. Then, the switching control unit 62 proceeds to step S125.

In step S125, the operating capacity setting unit 625 sets the operating capacity of the GF unit 30 on the basis of the calculated first load Gl. Furthermore, the operating capacity setting unit 625 outputs the GF capacity setting signal indicating the level of the set operating capacity to the drive signal generating unit 626. Then, the switching control unit 62 proceeds to step S126.

In step S126, the drive signal generating unit 626 receives the GF capacity setting signal that has been output from the operating capacity setting unit 625 and outputs the GF capacity setting signal together with the GF unit drive signal to the GF unit control unit 64. Then, the switching control unit 62 proceeds to step S127.

In step S127, the operating capacity setting unit 625 receives the "first difference value: large" determination signal or the "second difference value: small" determination signal that has been output from the determining unit 623 and calculates the second load Hl. Then, the switching control unit 62 proceeds to step S128.

In step S128, the operating capacity setting unit 625 sets the operating capacity of the HP unit 40 on the basis of the calculated second load Hl. Furthermore, the operating capacity setting unit 625 outputs the HP capacity setting signal indicating the level of the set operating capacity to the drive signal generating unit 626. Then, the switching control unit 62 proceeds to step S129.

In step S129, the drive signal generating unit 626 receives the HP capacity setting signal that has been output from the operating capacity setting unit 625 and outputs the HP capacity setting signal together with the HP unit drive signal to the HP unit control unit 65. Furthermore, the drive signal generating unit 626 outputs the HP unit drive signal to the acquiring unit 621. Then, the switching control unit 62 returns to step S101.

(5) Operating States of Each Unit

Figure 8:
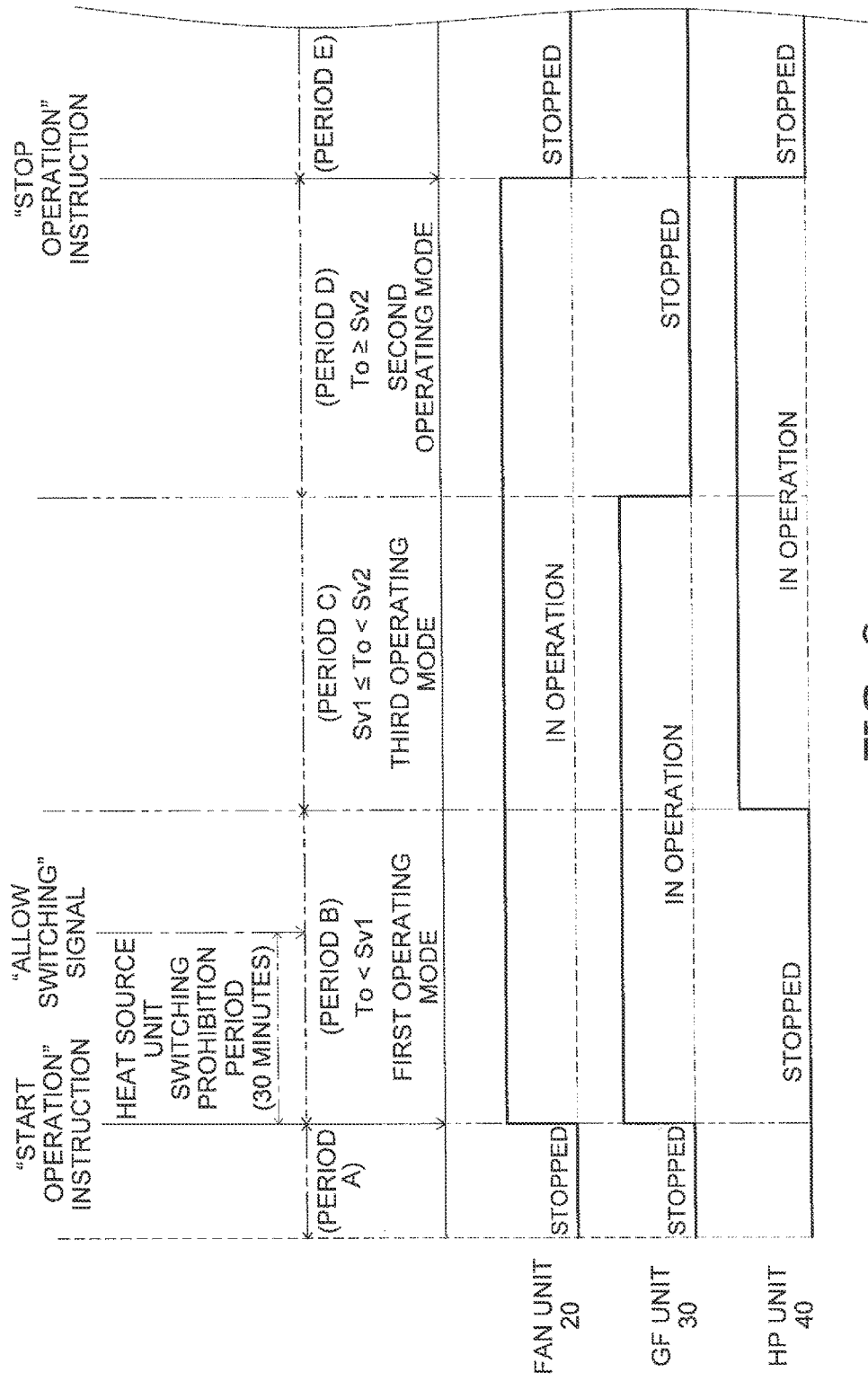
FIG. 8 is a timing chart showing an example of changes in the states of each unit in a case where a "start operation" instruction has been input.

The operating states of each unit of the heating system 10 will be described below with reference to FIG. 8. FIG. 8 is a timing chart showing an example of changes in the operating states of each unit in a case where the "start operation" instruction has been input.

In period A, the heating system 10 is stopped. That is, the fan unit 20, the GF unit 30, and the HP unit 40 are not in operation.

In period B, the fan unit 20 operates in accordance with the "start operation" instruction having been input. Furthermore, the first operating mode is selected in accordance with the outside air temperature To being less than the first standard value Sv1. That is, the controller 60 selects the first operating mode if the outside air temperature To is less than the first standard value Sv1. Because of this, the GF unit 30 operates at an operating capacity corresponding to the heat load. The period from this to until the "allow switching" signal is output by the determining unit 623 (that is, until 30 minutes elapse) is a heat source unit switching prohibition period in which switching of the heat source unit is prohibited. The HP unit 40 remains stopped.

In period C, the third operating mode is selected in accordance with the outside air temperature To having become equal or greater than the first standard value Sv1 and less than the second standard value Sv2. That is, the controller 60 selects the third operating mode if the outside air temperature To is equal or greater than the first standard value Sv1 and less than the second standard value Sv2. Because of this, the GF unit 30 operates at an operating capacity corresponding to the first load Gl and the HP unit 40 operates at an operating capacity corresponding to the second load Hl.

In period D, the second operating mode is selected in accordance with the outside air temperature To having become equal to or greater than the second standard value Sv2. That is, the controller 60 selects the second operating mode if the outside air temperature To is equal to or greater than the second standard value Sv2. Because of this, the GF unit 30 stops operating and the HP unit 40 operates at an operating capacity corresponding to the heat load.

In period E, the heating system 10 stops in accordance with the "stop operation" instruction having been input. That is, the fan unit 20, the GF unit 30, and the HP unit 40 stop operating.

(6) Function of Keeping Energy Efficiency from Dropping

The heating system 10's function of keeping the energy efficiency from dropping and function of keeping comfort from dropping will be described below.

(6-1) Function of Keeping Energy Efficiency from Dropping

The heating system 10 performs the outside air temperature determination while in operation and selects the first operating mode in a case where the outside air temperature To is less than the first standard value Sv1. Here, the first standard value Sv1 is a value meeting the condition that if the outside air temperature To is less than the first standard value Sv1, causing the GF unit 30 to operate as a heat source unit will result in a superior COP than causing the HP unit 40 to operate as a heat source unit. That is, in the heating system 10, in a case where the outside air temperature To is in a numerical value range in which causing the GF unit 30 to operate as a heat source unit will result in a superior COP than causing the HP unit 40 to operate as a heat source unit, the heating system 10 keeps the energy efficiency from dropping by causing the GF unit 30 to operate alone.

Furthermore, the heating system 10 performs the outside air temperature determination while in operation and selects the second operating mode in a case where the outside air temperature To is equal to or greater than the second standard value Sv2. Here, the second standard value Sv2 is a value meeting the condition that if the outside air temperature To is equal to or greater than the second standard value Sv2, causing the HP unit 40 to operate as the heat source unit will result in a superior COP than causing the GF unit 30 to operate as the heat source unit. That is, in the heating system 10, in a case where the outside air temperature To is in a numerical value range in which causing the HP unit 40 to operate as a heat source unit will result in a superior COP than causing the GF unit 30 to operate as a heat source unit, the heating system 10 keeps the energy efficiency from dropping by causing the HP unit 40 to operate alone.

Furthermore, the heating system 10 performs the outside air temperature determination while in operation and selects the third operating mode in a case where the outside air temperature To is equal to or greater than the first standard value Sv1 and less than the second standard value Sv2. Here, in a situation where the outside air temperature To is equal to or greater than the first standard value Sv1 and less than the second standard value Sv2, causing the GF unit 30 and the HP unit 40 to operate at the same time will result in a superior COP than causing the GF unit 30 or the HP unit 40 to operate alone, and the amount of time in which the indoor temperature Ti reaches the preset temperature Tp can be shortened. That is, in the heating system 10, in a case where the outside air temperature To is in a numerical value range in which causing the GF unit 30 and the HP unit 40 to operate at the same time will result in a superior COP than causing the GF unit 30 or the HP unit 40 to operate alone, the heating system 10 keeps the energy efficiency from dropping by causing the GF unit 30 and the HP unit 40 to operate at the same time.

To summarize the above, the heating system 10 is configured in such a way that the operating mode having superior energy efficiency is selected in accordance with a parameter relating to the outside air temperature To, which changes with time. That is, whether to cause one of the GF unit 30 and the HP unit 40 to operate as a heat source unit or whether to cause both to operate as a heat source unit is decided on the basis of superior or inferior energy efficiency. In this way, the energy efficiency is kept from dropping.

Furthermore, while in operation the heating system 10 switches the operating modes in accordance with changes in the outside air temperature To, calculates the heat load, the first load Gl, and the second load Hl in accordance with changes in the outside air temperature To, the indoor temperature Ti, and the preset temperature Tp, and adjusts in real time the operating capacities of the GF unit 30 and the HP unit 40. In other words, the heating system 10 is configured in such a way that it can cause the heat source unit to operate at an operating capacity having superior energy efficiency in accordance with changes in the outside air temperature To, the indoor temperature Ti, and the preset temperature Tp.

Specifically, the heating system 10 is configured in such a way that the operating capacity of the combustion unit 36 is set on the basis of the calculated heat load and first load Gl and the GF unit 30 is operated at an operating capacity corresponding to the situation. Furthermore, the heating system 10 is configured in such a way that the rotating speed of the compressor 45 is set on the basis of the calculated heat load and second load Hl and the HP unit 40 is operated at an operating capacity corresponding to the situation. In this way, the energy efficiency is kept from dropping.

(6-2) Function of Keeping Comfort from Dropping

The heating system 10 is configured in such a way that when the first difference value Dv1 is less than the first threshold value ΔTh1 while the heating system 10 is operating in the third operating mode, the combustion unit 36 is driven at an operating capacity whose level is lower than it is when the first difference value Dv1 is equal to or greater than the first threshold value ΔTh1. That is, when the indoor temperature Ti has become closer to the preset temperature Tp while the heating system 10 is operating in the third operating mode, the GF unit 30 has its operating capacity reduced. For this reason, comfort can be kept from dropping because of the indoor temperature Ti exceeding the preset temperature Tp.

Furthermore, the heating system 10 is configured in such a way that when the second difference value Dv2 is equal to or greater than the second threshold value ΔTh2 while the heating system 10 is operating in the third operating mode, the compressor 45 is driven at a lower rotating speed than it is when the second difference value Dv2 is less than the second threshold value ΔTh2. That is, when the indoor temperature Ti has exceeded the preset temperature Tp beyond a predetermined value while the heating system 10 is operating in the third operating mode, the HP unit 40 has its operating capacity reduced. For this reason, the indoor temperature Ti is easily maintained near the preset temperature Tp and comfort can be kept from dropping.

Furthermore, the heating system 10 is configured in such a way that, while in operation, the predetermined heat source unit switching prohibition period is set, so that switching of the heat source unit cannot be performed during this period. Specifically, the period from when operation of the heating system 10 is started to until the set time St (30 minutes) elapses is the heat source unit switching prohibition period. Because of this, the heating system 10 is configured in such a way that switching of the heat source unit is kept from being frequently performed during the predetermined period after startup and in such a way that it is difficult for comfort to drop.

(7) Characteristics (7-1)

In the above-described embodiment, the controller 60 has, as operating modes, the first operating mode in which the controller 60 causes the GF unit 30 to operate alone as a heat source unit, the second operating mode in which the controller 60 causes the HP unit 40 to operate alone as a heat source unit, and the third operating mode in which the controller 60 causes the GF unit 30 and the HP unit 40 to operate at the same time as a heat source unit, and the controller 60 selects the operating modes on the basis of a parameter relating to outside air temperature. That is, the operating modes are selected in accordance with a parameter relating to the outside air temperature To, which changes with time. Also, whether to cause one of the GF unit 30 and the HP unit 40 to operate as a heat source unit or cause both to operate as a heat source unit is decided on the basis of superior or inferior energy efficiency. Thus, the energy efficiency is kept from dropping.

(7-2)

In the above-described embodiment, the controller 60 selects the first operating mode when the outside air temperature To is less than the first standard value Sv1, selects the second operating mode when the outside air temperature To is equal to or greater than the second standard value Sv2 that is a higher temperature than the first standard value Sv1, and selects the third operating mode when the outside air temperature To is equal to or greater than the first standard value Sv1 and less than the second standard value Sv2. That is, the operating mode having superior energy efficiency is selected in accordance with the outside air temperature To, which changes with time. Thus, the energy efficiency is precisely kept from dropping.

(7-3)

In the above-described embodiment, in the third operating mode the controller 60 calculates, on the basis of the outside air temperature To, the indoor temperature Ti, and the preset temperature Tp, the first load Gl that is the heat load processed by the GF unit 30 and the second load Hl that is the heat load processed by the HP unit 40. Also, the controller 60 adjusts the operating capacities of the GF unit 30 and the HP unit 40 on the basis of the calculated first load Gl and second load Hl. That is, in a case where the GF unit 30 and the HP unit 40 are being operated at the same time as a heat source unit, the GF unit 30 and the HP unit 40 are operated at operating capacities whose energy efficiency is high in accordance with changes in the outside air temperature To, the indoor temperature Ti, and the preset temperature Tp. Thus, the energy efficiency is more precisely kept from dropping.

(7-4)

In the above-described embodiment, in the third operating mode the controller 60 decides the rotating speed of the compressor 45 on the basis of the second load Hl. That is, in a case where the GF unit 30 and the HP unit 40 are being operated at the same time as a heat source unit, the HP unit 40 is operated at an operating capacity whose energy efficiency is high in accordance with changes in the outside air temperature To, the indoor temperature Ti, and the preset temperature Tp. Thus, the energy efficiency is more precisely kept from dropping.

(7-5)

In the above-described embodiment, in the third operating mode the controller 60 decides the capacity of the combustion unit 36 on the basis of the first load Gl. That is, in a case where the GF unit 30 and the HP unit 40 are being operated at the same time as a heat source unit, the GF unit 30 is operated at an operating capacity whose energy efficiency is high in accordance with changes in the outside air temperature To, the indoor temperature Ti, and the preset temperature Tp. Thus, the energy efficiency is more precisely kept from dropping.

(7-6)

In the above-described embodiment, in the third operating mode, when the first difference value Dv1, which is a value obtained by subtracting the indoor temperature Ti from the preset temperature Tp, is less than the first threshold value $\Delta Th1$, the controller 60 causes the combustion unit 36 to operate in a state in which the operating capacity is lower than it is when the first difference value Dv1 is equal to or greater than the first threshold value $\Delta Th1$. That is, when the indoor temperature Ti has become closer to the preset temperature Tp in a case where the GF unit 30 and the HP unit 40 are being operated at the same time as a heat source unit, the operating capacity of the GF unit 30 is reduced. For this reason, the indoor temperature Ti is kept from exceeding the preset temperature Tp. Thus, comfort is kept from dropping.

(7-7)

In the above-described embodiment, in the third operating mode, when the second difference value Dv2, which is a value obtained by subtracting the preset temperature Tp from the indoor temperature Ti, is equal to or greater than the second threshold value $\Delta Th2$, the controller 60 sets the rotating speed of the compressor 45 lower than it is when the second difference value Dv2 is less than the second threshold value $\Delta Th2$. That is, when the indoor temperature Ti has exceeded the preset temperature Tp beyond a predetermined value in a case where the GF unit 30 and the HP unit 40 are being operated at the same time as a heat source unit, the operating capacity of the HP unit 40 is reduced. For this reason, the indoor temperature Ti is easily maintained near the preset temperature Tp. Thus, comfort is kept from dropping.

(8) Example Modifications (8-1) Example Modification A

In the above-described embodiment, the heating system 10 is employed as the air conditioning system, but the present invention is not limited to this. The present invention may also, for example, be configured as an air conditioning system in which a four-way switching valve is disposed in the outdoor unit 43 of the HP unit 40 and which is capable of performing a cooling operation apart from a heating operation. In this case, during the cooling operation, the indoor heat exchanger 42 functions as a refrigerant evaporator and the outdoor heat exchanger 47 functions as a refrigerant radiator or condenser.

(8-2) Example Modification B

In the above-described embodiment, the outside air temperature sensor 50 is connected via a cable (not shown in the drawings) to the outdoor unit control unit 51, but the outside air temperature sensor 50 may also be directly connected to the controller 60. In this case, the outside air temperature sensor 50 performs an analog-to-digital conversion and sends a digital signal to the controller 60, or the controller 60 receives an analog signal and performs an analog-to-digital conversion.

(8-3) Example Modification C

In the above-described embodiment, the controller 60 is connected via the cables 601 to each unit, but any or all of the outdoor unit control unit 51, the first power supply unit 211, the second power supply unit 342, the gas valve opening and closing unit 351, and the plug power supply unit 362 may also be disposed in the controller 60.

(8-4) Example Modification D

In the above-described embodiment, the controller 60 is included in the electrical component unit 52, but the present invention is not limited to this. For example, the controller 60 may also be disposed in the electrical component box 14 or may also be disposed in the outdoor unit 43. Furthermore, any or all of the storage unit 61, the switching control unit 62, the fan unit control unit 63, the GF unit control unit 64, the HP unit control unit 65, and the display control unit 66 included in the controller 60 may also be disposed in a remote location, for example, connected by a network such as a LAN or WAN. Furthermore, any or all of the acquiring unit 621, the calculating unit 622, the determining unit 623, the mode selecting unit 624, the operating capacity setting unit 625, and the drive signal generating unit 626 included in the switching control unit 62 may also be disposed in a remote location, for example, connected by a network such as LAN or WAN.

(8-5) Example Modification E

In the above-described embodiment, the switching control unit 62, the fan unit control unit 63, the GF unit control unit 64, the HP unit control unit 65, and the display control unit 66 acquire the control program from the storage unit 61. However, the present invention is not limited to this and may also be configured in such a way that, for example, the switching control unit 62, the fan unit control unit 63, the GF unit control unit 64, the HP unit control unit 65, and the display control unit 66 each have storage regions and store the control program in the storage regions.

(8-6) Example Modification F

In the above-described embodiment, the preset value Pv1 is set to −5 (° C.). However, the preset value Pv1 is not limited to this. It suffices for an appropriate numerical value to be set in accordance with the installation environment. For example, the preset value Pv1 may also be set to −7 (° C.) or −3 (° C.).

(8-7) Example Modification G

In the above-described embodiment, the first standard value Sv1 is set to −11 (° C.) and the second standard value Sv2 is set to −2 (° C.). However, the first standard value Sv1 may be set to any value provided that it meets the condition that if the outside air temperature To is less than the first standard value Sv1, causing the GF unit 30 to operate as a heat source unit will result in a superior COP than causing the HP unit 40 to operate as a heat source unit. For example, the first standard value Sv1 may also be set to −8 (° C.) or may also be set to −15 (° C.). Furthermore, the second standard value Sv2 may be set to any value provided that it meets the condition that if the outside air temperature To is equal to or greater than the second standard value Sv2, causing the HP unit 40 to operate as a heat source unit will result in a superior COP than causing the GF unit 30 to operate as a heat source unit. For example, the second standard value Sv2 may also be set to 0 (° C.) or may also be set to −5 (° C.).

(8-8) Example Modification H

In the above-described embodiment, the first threshold value ΔTh1 is set to 10 (° C.) and the second threshold value ΔTh2 is set to 1 (° C.). However, the first threshold value ΔTh1 and the second threshold value ΔTh2 are not limited to this. It suffices for appropriate numerical values to be set in accordance with the installation environment. For example, the first threshold value ΔTh1 may also be set to 8 (° C.) or may also be set to 12 (° C.). Furthermore, the second threshold value ΔTh2 may also be set to 0 (° C.) or may also be set to 3 (° C.).

(8-9) Example Modification I

In the above-described embodiment, the period from when the heating system 10 starts operating (startup) to until the set time St (30 minutes) elapses is the heat source unit switching prohibition period in which switching of the heat source unit to be caused to operate is prohibited. However, the heat source unit switching prohibition period is not invariably necessary and can also be omitted. In this case, step S105 is omitted from the flowchart of FIG. 7.

(8-10) Example Modification J

In the above-described embodiment, the controller 60 performs the control that switches the operating modes when the outside air temperature To has become a predetermined value (see steps S107, S108, S111, S112, and S115 in FIG. 7). However, the present invention is not limited to this, and a predetermined delay time may also be disposed in the control.

For example, the controller 60 may also be configured to select the first operating mode when a predetermined amount of time elapses after the outside air temperature To has become less than the first standard value Sv1 while the heating system 10 is in operation. Furthermore, the controller 60 may also be configured to select the second operating mode when a predetermined amount of time elapses after the outside air temperature To has become equal to or greater than the second standard value Sv2 while the heating system 10 is in operation. Furthermore, the controller 60 may also be configured to select the third operating mode when a predetermined amount of time elapses after the outside air temperature To has become equal to or greater than the first standard value Sv1 and less than the second standard value Sv2 while the heating system 10 is in operation.

Because of this, it becomes possible to switch the operating modes in a case where a condition is reliably met. The delay time is set to 30 seconds or 1 minute, for example, but is not limited to this. It suffices for an appropriate numerical value to be set in accordance with the installation environment.

(8-11) Example Modification K

In the above-described embodiment, the controller 60 performs, at a predetermined timing, the indoor temperature determination that is a determination of whether or not the first difference value Dv1 is equal to or greater than the predetermined preset value Pv1 (see step S103 in FIG. 7). However, the indoor temperature determination is not invariably necessary and can be omitted. In this case, steps S103 and S104 are omitted from the flowchart of FIG. 7.

(8-12) Example Modification L

In the above-described embodiment, in a case where, in the difference value determination, the first difference value Dv1 is less than the first threshold value ΔTh1, control is performed in such a way that the first load Gl is calculated and the GF unit 30 is operated at an operating capacity that has been set on the basis of the calculated first load Gl (see step S117 to step S119 in FIG. 7). However, the present invention is not limited to this, and in a case where the first difference value Dv1 is less than the first threshold value ΔTh1, control may also be performed in such a way that the operation of the combustion unit 36 is stopped (that is, the operation of the GF unit 30 is stopped). In this case, step S117 and step S118 in FIG. 7 are omitted, and it suffices to configure the invention in such a way that in step S119, the GF unit stop signal is output from the drive signal generating unit 626 to the GF unit control unit 64.

(8-13) Example Modification M

In the above-described embodiment, in a case where, in the difference value determination, the second difference value Dv2 is equal to or greater than the second threshold value ΔTh2, control is performed in such a way that the second load Hl is calculated and the HP unit 40 is operated at an operating capacity that has been set on the basis of the calculated second load Hl (see step S121 to step S123 in FIG. 7). However, the present invention is not limited to this, and in a case where the second difference value Dv2 is equal to or greater than the second threshold value ΔTh2, control may also be performed in such a way that the operation of the compressor 45 is stopped (that is, the operation of the HP unit 40 is stopped). In this case, step S121 and step S122 in FIG. 7 are omitted, and it suffices to configure the invention in such a way that in step S123, the HP unit stop signal is output from the drive signal generating unit 626 to the HP unit control unit 65.

(8-14) Example Modification N

In the above-described embodiment, the determining unit 623 judges whether or not the count time Ct is equal to or greater than the set time St, and the set time St in this judgment is set to 30 minutes. However, the set time St is not limited to this and can be appropriately changed in accordance with the installation environment. For example, the set time St may also be set to 20 minutes or may also be set to 1 hour.

(8-15) Example Modification O

Figure 9:
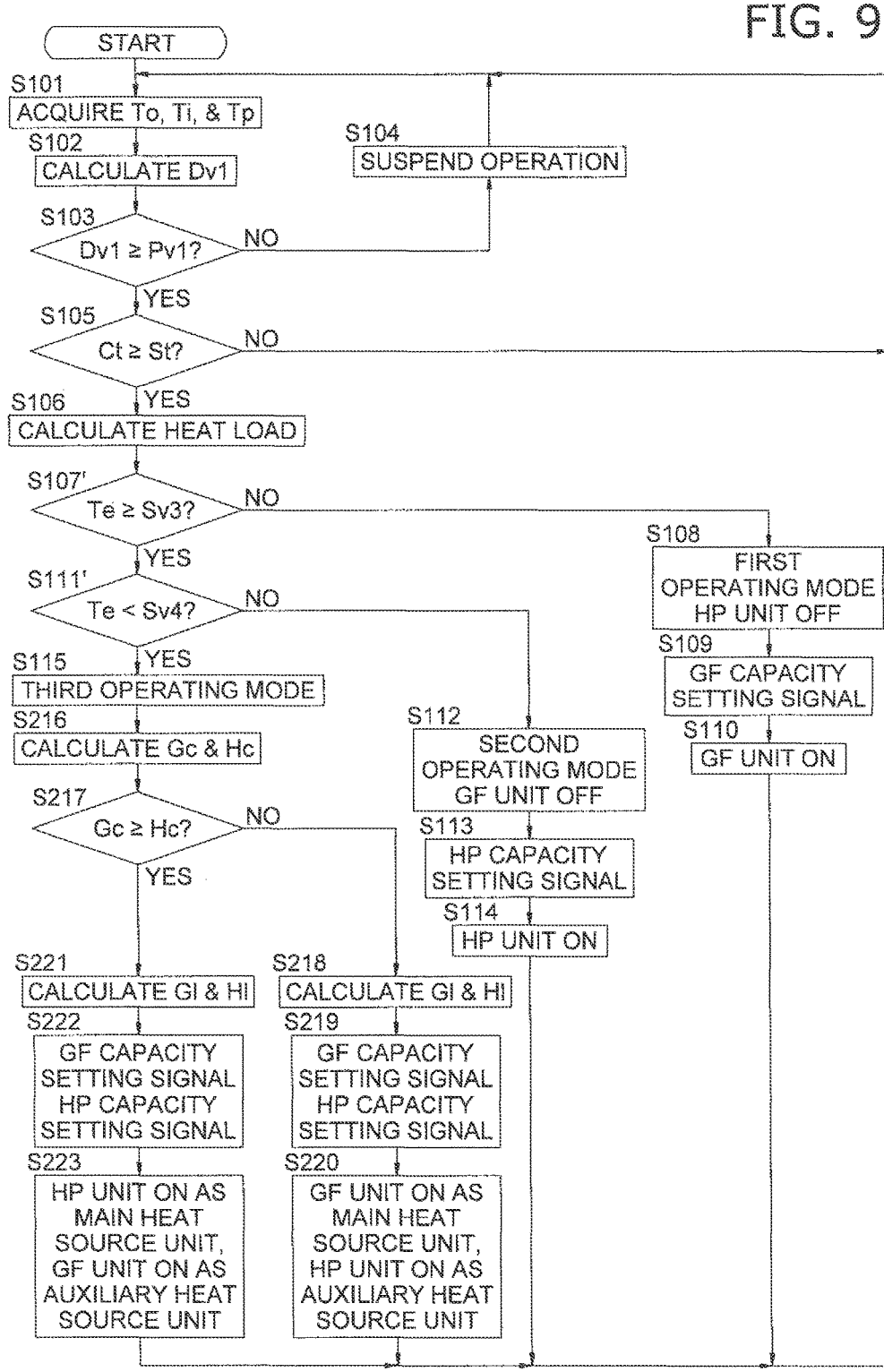
FIG. 9 is a flowchart showing a flow of processing by the switching control unit according to example modification O.

In the above-described embodiment, when power to the heating system 10 is switched on and the "start operation" instruction is input, the switching control unit 62 performs processing with a flow such as shown in FIG. 7. However, the switching control unit 62 may also perform processing with a flow such as shown in FIG. 9. The flow of processing shown in FIG. 9 will be described below.

Step S101 to step S115 in FIG. 9 are the same as the corresponding steps in FIG. 7 except for steps S107' and S111'.

In step S107', the determining unit 623 performs an outside air temperature determination in which it determines whether or not the evaporation temperature Te is equal to or greater than a third standard value Sv3 instead of determining whether or not the outside air temperature To is equal to or greater than the first standard value Sv1. In a case where, as a result of the outside air temperature determination, the determination is NO (that is, in a case where the evaporation temperature Te is less than the third standard value Sv3), the determining unit 623 outputs the "outside air temperature: low" determination signal to the mode selecting unit 624. Then, the switching control unit 62 proceeds to step S108. In a case where the determination is YES (that is, in a case where the evaporation temperature Te is equal to or greater than the third standard value Sv3), the switching control unit 62 proceeds to step S111'. The third standard value Sv3 is preset in the control program as a value meeting the condition that if the evaporation temperature Te is less than the third standard value Sv3, causing the GF unit 30 to operate as a heat source unit will result in a superior COP than causing the HP unit 40 to operate as a heat source unit. For example, the third standard value Sv3 is set to −5 (° C.), but it is not limited to this and can be appropriately changed in accordance with the refrigerant that is used and the installation environment.

In step S111, the determining unit 623 performs an outside air temperature determination in which it determines whether or not the evaporation temperature Te is less than a fourth standard value Sv4. In a case where, as a result of the outside air temperature determination, the determination is NO (that is, in a case where the evaporation temperature Te is equal to or greater than the fourth standard value Sv4), the determining unit 623 outputs the "outside air temperature: high" determination signal to the mode selecting unit 624. Then, the switching control unit 62 proceeds to step S112. In a case where the determination is YES (that is, in a case where the evaporation temperature Te is less than the fourth standard value Sv4), the determining unit 623 outputs the "outside air temperature: intermediate" determination signal to the mode selecting unit 624. Then, the switching control unit 62 proceeds to step S115. The fourth standard value Sv4 is preset higher than the third standard value Sv3 in the control program as a value meeting the condition that if the evaporation temperature Te is equal to or greater than the fourth standard value Sv4, causing the HP unit 40 to operate as a heat source unit will result in a superior COP than causing the GF unit 30 to operate as a heat source unit. For example, the fourth standard value Sv4 is set to 5 (° C.), but it is not limited to this and can be appropriately changed in accordance with the refrigerant that is used and the installation environment.

Here, the evaporation temperature Te changes in accordance with changes in the outside air temperature To. Specifically, when the outside air temperature To rises, the evaporation temperature Te also rises, and when the outside air temperature To falls, the evaporation temperature Te also falls. That is, the evaporation temperature Te can be said to be a "parameter relating to the outside air temperature To".

In step S115, the mode selecting unit 624 receives the "outside air temperature: intermediate" determination signal that has been output from the determining unit 623, selects the third operating mode, and outputs the third operating mode selection signal to the determining unit 623. Then, the switching control unit 62 proceeds to step S216.

In step S216, the calculating unit 622 receives the third operating mode selection signal that has been output from the mode selecting unit 624 and calculates the first cost Gc in the case of driving the GF unit 30 and the second cost Hc in the case of driving the HP unit 40. Furthermore, the calculating unit 622 outputs the calculated first cost Gc and second cost Hc to the determining unit 623. Then, the switching control unit 62 proceeds to step S217.

In step S217, the determining unit 623 performs the cost determination in which it determines whether or not the first cost Gc that has been output from the calculating unit 622 is equal to or greater than the second cost Hc. In a case where, as a result of the cost determination, the determination is NO (that is, in a case where the first cost Gc is less than the second cost Hc), the determining unit 623 outputs the "first cost: low" determination signal to the operating capacity setting unit 625. Then, the switching control unit 62 proceeds to step S218. In a case where the determination is YES (that is, in a case where the first cost Gc is equal to or greater than the second cost Hc), the determining unit 623 outputs the "first cost: high" determination signal to the operating capacity setting unit 625. Then, the switching control unit 62 proceeds to step S221.

In step S218, the operating capacity setting unit 625 receives the "first cost: low" determination signal that has been output from the determining unit 623 and calculates the first load Gl and the second load Hl. In the control program, a correlation between the heat load, the first cost Gc, and the first load Gl in the case of having received the "first cost: low" determination signal is defined and a correlation between the heat load, the second cost Hc, and the second load Hl in the case of having received the "first cost: low" determination signal is defined. The operating capacity setting unit 625 calculates the first load Gl and the second load Hl in accordance with the control program. More specifically, the operating capacity setting unit 625 sets, as the first load Gl, the majority of the heat load that has been output from the calculating unit 622 and sets, as the second load Hl (which corresponds to a "third load"), the remainder of the heat load excluding the first load Gl in order to cause the GF unit 30 to operate as a main heat source unit and cause the HP unit 40 to operate as an auxiliary heat source unit. The ratio of the first load Gl to the second load Hl in this case is set to 7:3 or 8:2, for example. However, the ratio is not limited to this and can also be appropriately changed. After the above processing, the switching control unit 62 proceeds to step S219.

In step S219, the operating capacity setting unit 625 sets the operating capacity of the GF unit 30 on the basis of the calculated first load Gl and outputs the GF capacity setting signal indicating the level of the set operating capacity to the drive signal generating unit 626. Furthermore, the operating capacity setting unit 625 sets the operating capacity of the HP unit 40 on the basis of the calculated second load Hl and outputs the HP capacity setting signal indicating the level of the set operating capacity to the drive signal generating unit 626. Then, the switching control unit 62 proceeds to step S220.

In step S220, the drive signal generating unit 626 receives the GF capacity setting signal that has been output from the operating capacity setting unit 625 and outputs the GF capacity setting signal together with the GF unit drive signal to the GF unit control unit 64. Furthermore, the drive signal generating unit 626 receives the HP capacity setting signal that has been output from the operating capacity setting unit 625 and outputs the HP capacity setting signal together with the HP unit drive signal to the HP unit control unit 65. Furthermore, the drive signal generating unit 626 outputs the HP unit drive signal to the acquiring unit 621. Then, the switching control unit 62 returns to step S101.

In step S221, the operating capacity setting unit 625 receives the "first cost: high" determination signal that has been output from the determining unit 623 and calculates the first load Gl and the second load Hl. In the control program, a correlation between the heat load, the first cost Gc, and the first load Gl in the case of having received the "first cost: high" determination signal is defined and a correlation between the heat load, the second cost Hc, and the second load Hl in the case of having received the "first cost: high" determination signal is defined. The operating capacity setting unit 625 calculates the first load Gl and the second load Hl in accordance with the control program. More specifically, the operating capacity setting unit 625 sets, as the second load Hl, the majority of the heat load that has been output from the calculating unit 622 and sets, as the first load Gl (which corresponds to a "third load"), the remainder of the heat load excluding the second load Hl in order to cause the HP unit 40 to operate as a main heat source unit and cause the GF unit 30 to operate as an auxiliary heat source unit. The ratio of the first load Gl to the second load Hl in this case is set to 3:7 or 2:8, for example. However, the ratio is not limited to this and can also be appropriately changed. After the above processing, the switching control unit 62 proceeds to step S222.

In step S222, the operating capacity setting unit 625 performs the same processing as in step S219. Then, the switching control unit 62 proceeds to step S223.

In step S223, the drive signal generating unit 626 performs the same processing as in step S220. Then, the switching control unit 62 returns to step S101.

As described above, in a case where the switching control unit 62 performs processing such as shown in FIG. 9, in the third operating mode whichever of the GF unit 30 and the HP unit 40 has the lower operating cost is operated as a main heat source unit and whichever of the GF unit 30 and the HP unit 40 has the higher operating cost is operated as an auxiliary heat source unit. Furthermore, the load processed by the auxiliary heat source unit is calculated, and the operating capacity of the auxiliary heat source unit is adjusted on the basis of this. That is, in the case of operating the GF unit 30 and the HP unit 40 at the same time, the operating capacity of whichever of the GF unit 30 and the HP unit 40 has the lower operating cost is set high and the operating capacity of whichever of the GF unit 30 and the HP unit 40 has the higher operating cost is set low. Because of this, the operating cost is kept from rising.

The present invention can be utilized in air conditioning systems equipped with a gas furnace unit and a heat pump unit.

The invention claimed is:
1. An air conditioning system comprising:
a heat pump unit that includes a refrigerant radiator;
a gas furnace unit that includes a heating section configured to heat air passing through the heating section;
a blower configured to generate an air flow that passes through the radiator and the heating section;
a controller configured to control operation of the heat pump unit, the gas furnace unit, and the blower; and
a first temperature sensor arranged and configured to detect the outside air temperature,
the controller having operating modes including
a first operating mode in which the controller causes the gas furnace unit to operate alone as a heat source unit,
a second operating mode in which the controller causes the heat pump unit to operate alone as a heat source unit, and
a third operating mode in which the controller causes the gas furnace unit and the heat pump unit to operate at the same time as a heat source unit,
the controller being configured to select the operating modes based on a parameter relating to outside air temperature that is the temperature of outside air,
the controller being further configured to select
the first operating mode when the outside air temperature is less than a first standard value,
the second operating mode when the outside air temperature is equal to or greater than a second standard value that is a higher temperature than the first standard value, and the third operating mode when the outside air temperature is equal to or greater than the first standard value and less than the second standard value, and the controller being further configured to calculate a total load of the heat source unit, in the third operating mode, an operating capacity of the gas furnace unit being set to be larger than an operating capacity of the heat pump unit when the total load of the heat source unit is larger than a predetermined value, and the operating capacity of the heat pump unit being set to be larger than the operating capacity of the gas furnace unit when the total load of the heat source unit is not larger than the predetermined value.

2. The air conditioning system according to claim 1, further comprising a second temperature sensor arranged and configured to detect an evaporation temperature of refrigerant in the heat pump unit, the controller being configured to select the first operating mode when the evaporation temperature is less than a third standard value, the second operating mode when the evaporation temperature is equal to or greater than a fourth standard value that is a higher temperature than the third standard value, and the third operating mode when the evaporation temperature is equal to or greater than the third standard value and less than the fourth standard value.

3. The air conditioning system according to claim 1, further comprising a third temperature sensor installed in a room and arranged and configured to detect an indoor temperature that is the temperature in the room, in the third operating mode the controller being configured to calculate a first load that is a heat load processed by the gas furnace unit among the total load of the heat source unit and a second load that is a heat load processed by the heat pump unit among the total load of the heat source unit based on the outside air temperature, the indoor temperature, and a preset temperature, and adjust operating capacities of the gas furnace unit and the heat pump unit based on the first load and the second load.

4. The air conditioning system according to claim 3, wherein the heat pump unit further includes a compressor configured to compress refrigerant, a rotating speed of the compressor is variably adjustable by the controller, and in the third operating mode the controller is configured to determine the rotating speed of the compressor based on the second load.

5. The air conditioning system according to claim 3, wherein the gas furnace unit further includes a combustion unit configured to have gas combust therein, and in the third operating mode the controller is configured to determine capacity of the combustion unit based on the first load.

6. The air conditioning system according to claim 1, further comprising a third temperature sensor installed in a room and arranged and configured to detect an indoor temperature that is the temperature in the room, the gas furnace unit further including a combustion unit configured to have gas combust therein, and in the third operating mode the controller being configured to cause the combustion unit to operate in a first state when a first difference value, which is a value obtained by subtracting the indoor temperature from a preset temperature, is equal to or greater than a first threshold value, and when the first difference value is less than the first threshold value, cause the combustion unit to operate in a second state in which the capacity is lower than in the first state or stop operation of the combustion unit.

7. The air conditioning system according to claim 1, further comprising a third temperature sensor installed in a room and arranged and configured to detect an indoor temperature that is the temperature in the room, the heat pump unit further including a compressor arranged and configured to compress gas refrigerant, a rotating speed of the compressor being variably adjustable by the controller, and in the third operating mode the controller being configured to set the rotating speed of the compressor to a first speed when a second difference value, which is a value obtained by subtracting a preset temperature from the indoor temperature, is less than a second threshold value, and when the second difference value is equal to or greater than the second threshold value, set the rotating speed of the compressor to a second speed lower than the first speed or stop driving of the compressor.

8. The air conditioning system according to claim 1, wherein in the third operating mode the controller is configured to cause one of the gas furnace unit and the heat pump unit to operate as a main heat source unit and cause the other of the gas furnace unit and the heat pump unit to operate as an auxiliary heat source unit, calculate a first cost when causing the gas furnace unit to operate as the main heat source unit and a second cost when causing the heat pump unit to operate as the main heat source unit, cause the gas furnace unit to operate as the main heat source unit and cause the heat pump unit to operate as the auxiliary heat source unit when the first cost is lower than the second cost, cause the heat pump unit to operate as the main heat source unit and cause the gas furnace unit to operate as the auxiliary heat source unit when the first cost is higher than the second cost, calculate a third load that is the heat load processed by the auxiliary heat source unit, and adjust the operating capacity of the auxiliary heat source unit based on the third load.

9. The air conditioning system according to claim 2, further comprising a third temperature sensor installed in a room and arranged and configured to detect an indoor temperature that is the temperature in the room, in the third operating mode the controller being configured to calculate a first load that is the heat load processed by the gas furnace unit among the total load of the heat source unit and a second load that is the heat load processed by the heat pump unit among the total load of the heat source unit based on the outside air temperature, the indoor temperature, and a preset temperature, and adjust operating capacities of the gas furnace unit and the heat pump unit based on first load and the second load.

10. The air conditioning system according to claim 9, wherein the heat pump unit further includes a compressor arranged and configured to compress refrigerant, a rotating speed of the compressor is variably adjustable by the controller, and in the third operating mode the controller is configured to decide rotating speed of the compressor based on the second load.

11. The air conditioning system according to claim 4, wherein the gas furnace unit further includes a combustion unit arranged and configured to combust gas therein, and in the third operating mode the controller is configured to decide capacity of the combustion unit based on the first load.

12. The air conditioning system according to claim 2, further comprising a third temperature sensor installed in a room and arranged and configured to detect an indoor temperature that is the temperature in the room, the gas furnace unit further including a combustion unit arranged and configured to combust gas therein, and in the third operating mode the controller being configured to cause the combustion unit to operate in a first state when a first difference value, which is a value obtained by subtracting the indoor temperature from a preset temperature, is equal to or greater than a first threshold value, and when the first difference value is less than the first threshold value, cause the combustion unit to operate in a second state in which the capacity is lower than it is in the first state or stop operation of the combustion unit.

13. The air conditioning system according to claim 2, further comprising a third temperature sensor installed in a room and arranged and configured to detect an indoor temperature that is the temperature in the room, the heat pump unit further including a compressor arranged and configured to compress gas refrigerant, a rotating speed of the compressor being variably adjustable by the controller, and in the third operating mode the controller being configured to set the rotating speed of the compressor to a first speed when a second difference value, which is a value obtained by subtracting a preset temperature from the indoor temperature, is less than a second threshold value, and when the second difference value is equal to or greater than the second threshold value, set the rotating speed of the compressor to a second speed lower than the first speed or stop driving of the compressor.

14. The air conditioning system according to claim 2, wherein in the third operating mode the controller is configured to cause one of the gas furnace unit and the heat pump unit to operate as a main heat source unit and cause the other of the gas furnace unit and the heat pump unit to operate as an auxiliary heat source unit, calculate a first cost when causing the gas furnace unit to operate as the main heat source unit and a second cost when causing the heat pump unit to operate as the main heat source unit, cause the gas furnace unit to operate as the main heat source unit and cause the heat pump unit to operate as the auxiliary heat source unit when the first cost is lower than the second cost, cause the heat pump unit to operate as the main heat source unit and cause the gas furnace unit to operate as the auxiliary heat source unit when the first cost is higher than the second cost, calculate a third load that is the heat load processed by the auxiliary heat source unit, and adjust the operating capacity of the auxiliary heat source unit based on the third load.

* * * * *